US 9,004,201 B2

(12) United States Patent
Xi et al.

(10) Patent No.: US 9,004,201 B2
(45) Date of Patent: Apr. 14, 2015

(54) JUMPING ROBOT

(71) Applicants: Ning Xi, Okemos, MI (US); Jianguo Zhao, East Lansing, MI (US); Bingtuan Gao, East Lansing, MI (US); Jing Xu, East Lansing, MI (US); Matt Mutka, Okemos, MI (US); Li Xiao, Okemos, MI (US)

(72) Inventors: Ning Xi, Okemos, MI (US); Jianguo Zhao, East Lansing, MI (US); Bingtuan Gao, East Lansing, MI (US); Jing Xu, East Lansing, MI (US); Matt Mutka, Okemos, MI (US); Li Xiao, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 282 days.

(21) Appl. No.: 13/832,284

(22) Filed: Mar. 15, 2013

(65) Prior Publication Data

US 2013/0282174 A1     Oct. 24, 2013

Related U.S. Application Data

(60) Provisional application No. 61/625,881, filed on Apr. 18, 2012.

(51) Int. Cl.
*B62D 57/00* (2006.01)
*B25J 9/16* (2006.01)
*B25J 9/10* (2006.01)

(52) U.S. Cl.
CPC .............. *B25J 9/1682* (2013.01); *Y10S 901/01* (2013.01); *B25J 9/104* (2013.01)

(58) Field of Classification Search
CPC ....... B62D 57/032; B62D 57/02; B62D 57/00
See application file for complete search history.

(56) References Cited

U.S. PATENT DOCUMENTS

| 1,573,527 | A | 2/1926 | Simonek |
| 2,938,300 | A | 5/1960 | Newbert et al. |
| 3,086,738 | A | 4/1963 | Lubash |
| 4,204,359 | A | 5/1980 | Plo |
| 4,624,648 | A | 11/1986 | Waters |
| 4,702,720 | A | 10/1987 | Konta et al. |
| 4,894,042 | A | 1/1990 | Kamikawa |
| 5,040,626 | A | 8/1991 | Paynter |
| 5,188,315 | A | 2/1993 | Foitzik et al. |
| 5,413,514 | A | 5/1995 | Milligan |
| 5,618,219 | A | 4/1997 | Simone et al. |
| 5,964,639 | A | 10/1999 | Maxim |

(Continued)

FOREIGN PATENT DOCUMENTS

| CN | 101327817 A | 12/2008 |
| CN | 201240437 Y | 5/2009 |

(Continued)

OTHER PUBLICATIONS

Zhao, Jianguo, et al.; "Development of a Controllable and Continuous Jumping Robot," 2011 IEEE International Conference on Robotics and Automation, May 19-13, 2011, pp. 4614-1419.

(Continued)

*Primary Examiner* — Tony Winner
(74) *Attorney, Agent, or Firm* — Harness, Dickey & Pierce, P.L.C.

(57) ABSTRACT

A jumping robot is provided. In another aspect, a jumping robot weighs less than 50 grams, jumps at least 20 cm high and has a maximum linear dimension of 10 cm. A further aspect provides a robot that employs an electromagnetic actuator that actuates at least two of: jumping, steering, self-righting, and/or mid-air orientation control.

48 Claims, 18 Drawing Sheets

(56) References Cited

U.S. PATENT DOCUMENTS

| | | |
|---|---|---|
| 6,247,546 B1 | 6/2001 | Spletzer et al. |
| 6,484,068 B1 | 11/2002 | Yamamoto et al. |
| 7,249,640 B2 | 7/2007 | Horchler et al. |
| 7,270,589 B1 | 9/2007 | Brown, Jr. et al. |
| 7,434,638 B2 | 10/2008 | Tanielian |
| 7,481,691 B2 | 1/2009 | Sze et al. |
| 7,503,410 B2 | 3/2009 | Delson |
| 7,963,351 B2 | 6/2011 | Troy |

FOREIGN PATENT DOCUMENTS

| | | |
|---|---|---|
| CN | 201703452 U | 1/2011 |
| CN | 201769932 U | 3/2011 |
| CN | 102050156 A | 5/2011 |
| CN | 102050157 A | 5/2011 |
| CN | 201815109 U | 5/2011 |
| KR | 20110000852 A | 1/2011 |

OTHER PUBLICATIONS

Ackerman, Evan; "Brillant Little Jumping Robot Only Needs One Motor," ...ieee.org/.../brillant-little-jumping-robot-only-needs-one-motor, posted Jun. 6, 2011, pp. 1-2.

Ackerman, Evan; "World's Cleverest Jumping Robot Gets Faster, More Agile," ...ieee.org/.../worlds-cleverest-jumping-robot-gets-faster-mor . . . , posted Nov. 28, 2011.

Kaur, Kanwalpreet: "A Study of Bio-Inspired Jumping Robots," International Journal of Computer Applications, vol. 48, No. 12, Jun. 2012, pp. 40-43.

Zhao, Jianguo et al., "A Single Motor Actuated Miniature Steerable Jumping Robot," 2012 IEEE/RSJ International Conference on Intelligent Robots and Systems, Oct. 7-12, 2012, pp. 4274-4275.

Kovac, Mirko et al.; "A miniature 7g jumping robot," http://infoscience.epfl.ch/record/111783?ln=en, Proceedings of IEEE International Conference on Robotics and Automation (ICRA '2008), publicly presented and/or published May 19-23, 2008; pp. 373-378 (7 pages, includng Abstract page).

Kovac, Mirko et al.; "Steerable miniature jumping robot," Auton Robot 2010, 28, published Dec. 30, 2009; pp. 295-306.

Kovac, Mirko, et al.; "A Miniature Jumping Robot with Self-Recovery Capabilities," http://infoscience.epfl.ch/record/139011?ln=en, Proceedings of the IEEE/RSJ International Conference on Intelligent Robots and Systems, 2009, publicly presented and/or published Oct. 11-15, 2009; pp. 583-588 (7 pages, including Abstract page).

"Draganfly Innovations' New UAV Helicopter:The Draganflyer X6—Industrial 6-Rotor Unmanned Helicopter Provides High Definition Wireless Vido and High Resolution Photographs;" Draganfly Innovations, Inc., published Aug. 2008; 2 pages.

"Draganfly X6 UAV Helicopter Wins Popular Science Best of What's New Award in Aviation & Space;" Draganfly Innovations, Inc., published Nov. 2008; 2 pages.

"Sling-Copter—The Amazing Spinning Flying Helicopter Toy;" internet advertisement, Sling Copter, www.slingcopter.com <http://www.slingcopter.com>, published 2011; 3 pages.

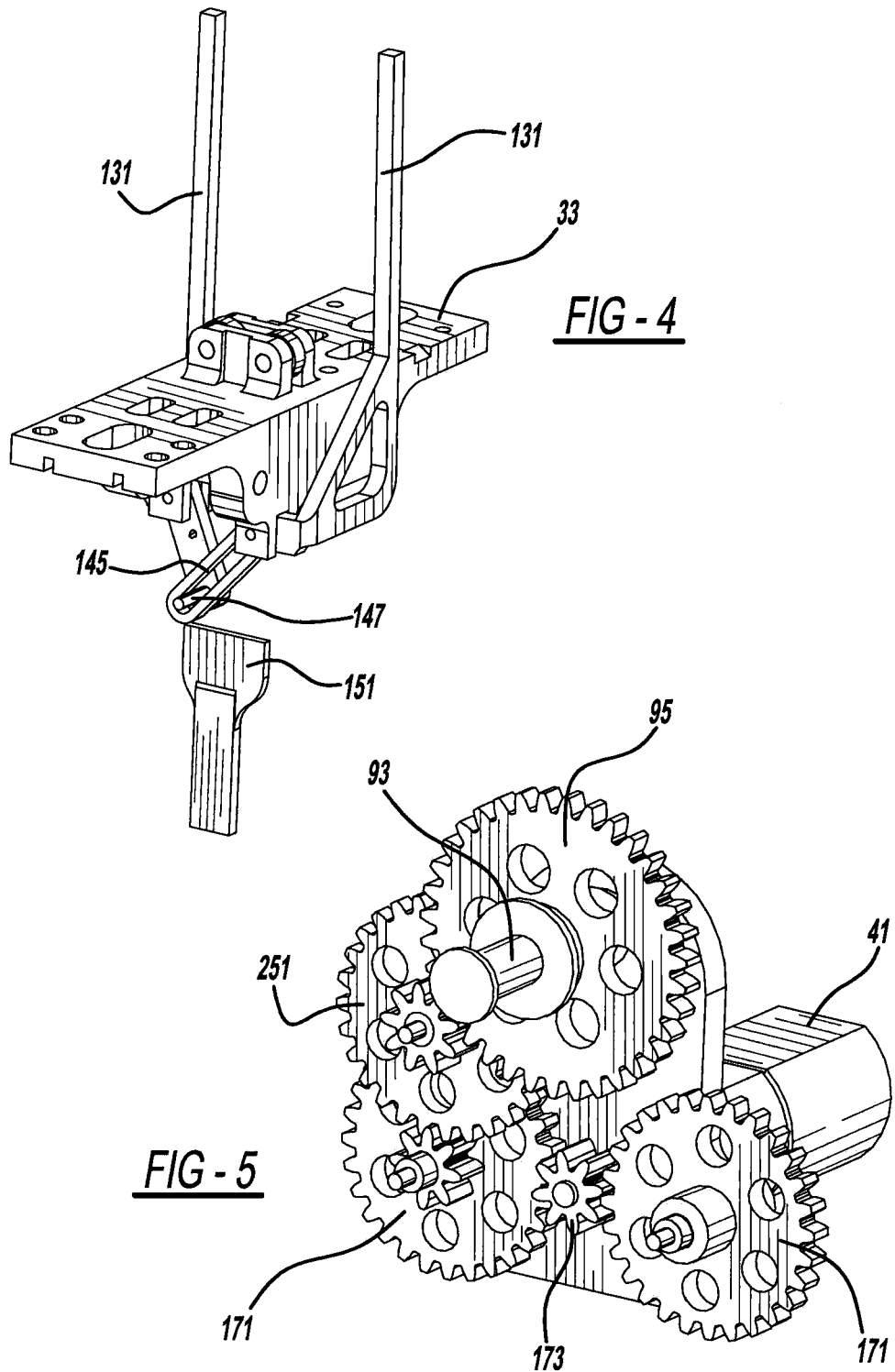

JUMPING ROBOT

CROSS REFERENCE TO RELATED APPLICATION

This application claims the benefit of U.S. Provisional Application Ser. No. 61/625,881, filed on Apr. 18, 2012, which is incorporated by reference herein.

STATEMENT OF GOVERNMENT INTEREST

This invention was made with government support under CNS0721441 awarded by the National Science Foundation. The government has certain rights in this invention.

BACKGROUND AND SUMMARY

The disclosure relates generally to robots and more particularly to a jumping robot.

Many robots with jumping ability are known. For these traditional designs, jumping is accomplished by an instant release of the energy stored in the robot. As a result, all the robots with jumping ability can be classified by their energy storage methods. The most popular conventional method to store the energy is based on traditional springs such as compression, extension, or torsion springs. One exemplary jumping robot uses a motor-driven ball screw to charge and release a compression spring. In another example, the energy in an extension spring is stored and released through a geared six-bar mechanism. Yet a further example utilizes a slip gear system to store and release the energy in an extension spring via a four-bar mechanism.

Still another conventional robot employs a planetary gear train and a one-way clutch, where a conical spring directly strikes the ground. Prior prototype robots employ a motor driven eccentric cam to charge a torsion or two extension springs that actuates rear legs. A wheel-based, stair-climbing robot with soft landing ability has a jumping mechanism based on four compression springs. Another exemplary version, known as the EPFL jumper, can achieve a jumping height about 1.4 m with torsion springs charged and released by a motor driven cam system; see Kovac, M. et al., "A Miniature 7 g Jumping Robot," Proc. IEEE Int. Conf. Robot. Autom. (2008) at 373-378. This robot was later modified to add self-recovery capability and jumping direction changing ability; see Kovac, M. et al., "Steerable Miniature Jumping Robot," Auton. Robots, Vol. 28, No. 3 (2010) at 295-306; and Kovac, M. et al., "A Miniature Jumping Robot with Self-Recovery Capabilities," Proc. IEEE/RSJ Int. Conf. Intell. Robots Systems (2009) at 583-588. In another construction, a multimodal robot can jump up to 1.7 m based on two symmetrical extension spring-actuated four-bar mechanisms.

A second traditional method for energy storage is based on elastic elements such as customized special springs. A scout robot employs a motor-driven winch to charge a single bending plate spring and release it to directly strike the ground for jumping. A conventional compact jumping robot utilizes an elastic strip to form closed elastica, which is actuated by two revolute joints. With two symmetrical power springs made of carbon fiber strips as legs, another conventional microbot charges its springs with dielectric elastomer actuators. In another example, known as the Jollbot, a spherical structure formed by several metal semi-circular hoops is used to store energy in the hoops by deforming its spherical shape. A similar conventional idea is utilized in a deformable robot, but the material for hoops is replaced by shape memory alloy.

A third conventional method to store energy for jumping is based on compressed air. In this method, a robot usually carries an air tank and a pneumatic cylinder. The sudden release of air in the tank will force the cylinder to extend. A traditional rescue robot and a patrol robot employ cylinder extension to strike the ground for jumping. Instead of striking the ground, the jumping ability of another traditional robot, known as a quadruped Airhopper, is accomplished by several cylinder-actuated four-bar mechanisms. With a biped structure, another exemplary robot, different from other pneumatic-based jumping robots, uses several pneumatic artificial muscles for jumping.

In addition to the preceding, there exist several other known devices. A pendulum jumping robot is based on the principle that momentum will be generated from swinging arms during human jumping. Furthermore, a jumping robot developed by the Sandia National Labs uses the energy from hydrocarbon fuels and can achieve a significant jumping height. Another robot is based on microelectromechanical ("MEMS") technology and has a small jumping height. Finally, an additional robot uses a voice coil actuator to charge energy into an electrical capacitor instead of a mechanical structure.

It is noteworthy, however, that traditional jumping robots are either too heavy, too expensive or too large. Furthermore, most conventional robots disadvantageously require multiple actuators which quickly use considerable battery power. While such robots may be needed for space exploration, their weight and size prevent them from achieving desired jumping heights and distances.

In accordance with the present invention, a jumping robot is provided. In another aspect, a jumping robot weighs less than 50 grams, jumps at least 20 cm high and has a maximum linear dimension of 10 cm. A further aspect provides a robot that employs a single electromagnetic actuator that actuates at least two of: jumping, steering and/or self-righting. Still another aspect employs multiple jumping robots that communicate with a remote communications station and/or each other either airborne or on the ground.

The present jumping robot is advantageous over traditional devices. For example, the present jumping robot is light weight and of small size thereby allowing it to achieve long jumping distances or large jumping heights. Furthermore, the present jumping robot is multifunctional in its movements driven by a single actuator; this assists with realizing the light weight, small size and low cost while requiring minor battery power such that more than 100 jumps can be made on a single battery charge. The present jumping robot is ideally suited for mass production so many of them can be used at a natural disaster site or in a war zone to locate victims or targets, respectively. The low cost nature avoids the need for recovery of the robot after use while allowing for many robots to be employed at a single site. Moreover, the significant jumping height allows for line-of-sight and/or airborne sensing and communications over rubble and other ground obstacles. The height of the jump provides a greater sensing and communications coverage area as well. Additional advantages and features of the present invention will become apparent from the following description and appended claims, taken in conjunction with the accompanying drawings.

BRIEF DESCRIPTION OF THE DRAWINGS

FIG. 4 is a perspective view showing a self-righting mechanism of the jumping robot;

FIG. 5 is a perspective view showing transmission and steering mechanisms of the jumping robot;

DETAILED DESCRIPTION

Figure 1:
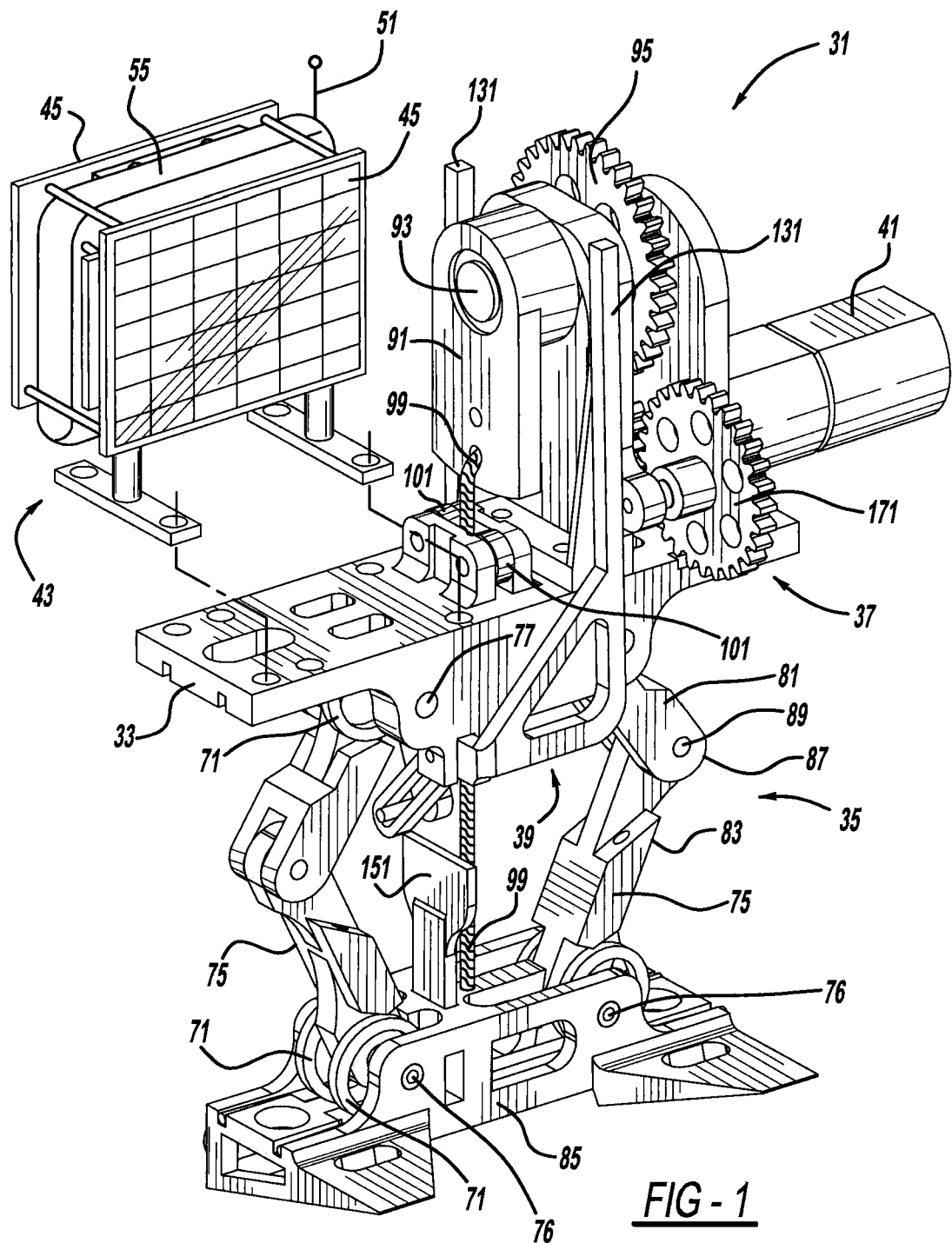
FIG. 1 is a top perspective view showing a jumping robot of the present invention.
Figure 2:
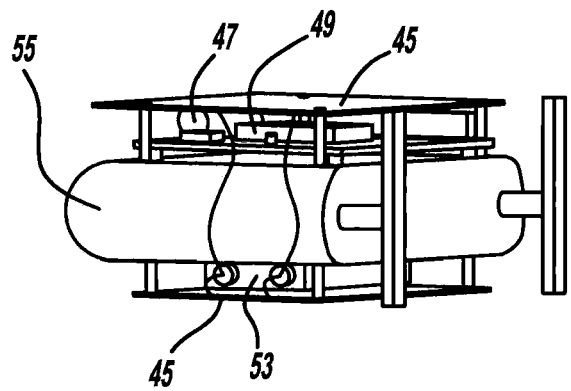
FIG. 2 is a bottom perspective view of an accessory assembly mounted to the jumping robot.
Figure 3:
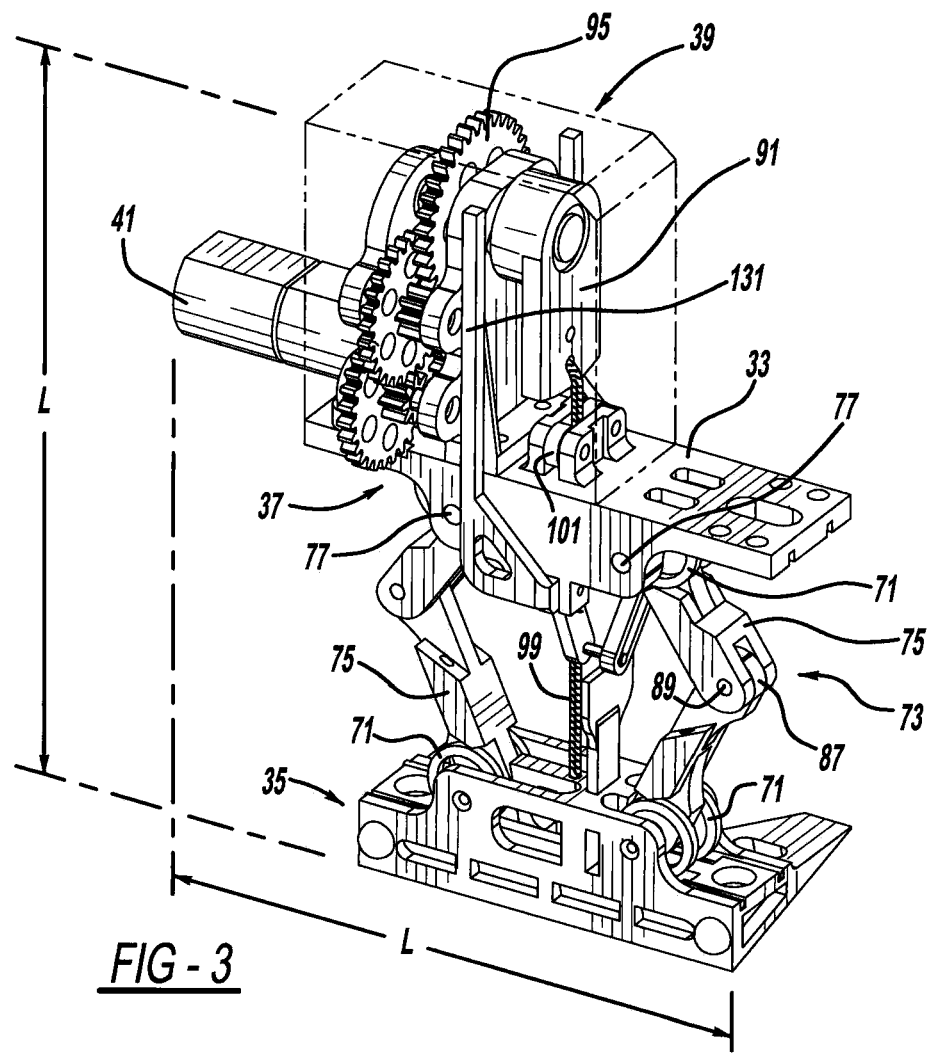
FIG. 3 is a top perspective view, taken opposite that of FIG. 1, showing the jumping robot.

The preferred embodiment of a jumping robot 31 as shown in FIGS. 1-3, includes a body 33, a jumping mechanism 35, a steering and transmission mechanism 37, a self-righting mechanism 39 and a single actuator 41. An accessory assembly 43 is also mounted to body 33 and includes solar panels 45 for generating electricity, sensors 47, a communications transmitter and receiver 49, an antenna 51, a battery 53 and a microprocessor based controller 55. The robot employs four mechanisms. The first one is jumping mechanism 35 that transforms stored energy into the kinetic energy for take-off. The second one is an energy or crank device that charges the energy and releases it instantly. The third one is self-righting mechanism 39 to have the robot stand up from any landing posture. The last one is steering mechanism 37 that changes the jumping direction of robot 31.

A. Jumping Mechanism:

Reference should be made to FIGS. 1, 6-10, 23 and 24. Torsion springs 71 are used to store energy since they can be implemented in a small size and light weight, they are off-the-shelf components which can be easily obtained at low cost, and good performance can be achieved. A spring-actuated six-bar mechanism 73 includes a pair of legs 75 coupled to body 33 by pivot pins 77 at hip joints and to foot 85 by pivot pins 76 at ankle joints. Each leg 75 is divided into two parts: an upper leg or femur 81 and a lower leg or tibia 83. The femur and tibia are joined at a knee joint 87 via a pivot pin 89 such that knee joints 87 bend outwardly away from each other. Each pair of adjacent leg parts act as elongated links connected by articulated revolute joints and they can rotate relative to each other. Therefore, jumping can be modelled by a planar parallel mechanism with foot 85 functioning as a fixed base, body 33 as the moving platform, and the two legs 75 as kinematic chains connecting the fixed base and moving platform.

Figure 6:
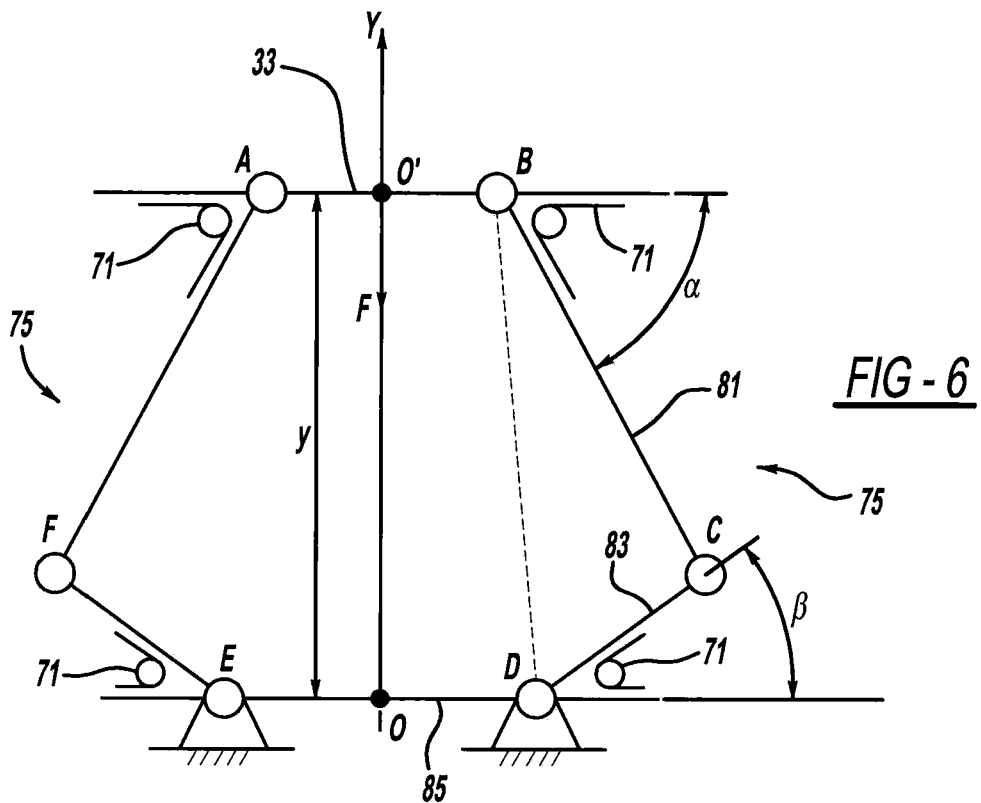
FIG. 6 is a diagrammatic view showing a jumping mechanism of the jumping robot.

The jumping mechanism, shown in FIG. 6, is symmetric with respect to a vertical line OO'. Six revolute joints are placed at A, B, C, D, E, and F. A coordinate frame is established with an X axis along $\overrightarrow{ED}$, and a Y-axis along $\overrightarrow{OO'}$. The link lengths are denoted as $$|AB|=l_1, |BC|=|AF|=l_2, |CD|=|FE|=l_3, \text{and } |DE|=l_4. \quad (1)$$

A vertical distance y is between AB and ED, and the angle α is between $\overrightarrow{AB}$ and $\overrightarrow{BC}$, and an angle β is between $\overrightarrow{DC}$ and X. The mechanism has three planar degrees of freedom from the Kutzbach-Grübler mobility formula. Nevertheless, if eight torsion springs with spring constant k are placed at A, B, E, and D, two springs for each place, then the springs can be charged to store energy if a vertical downward force F is applied at point O', and the energy is released once F is removed.

Figure 7:
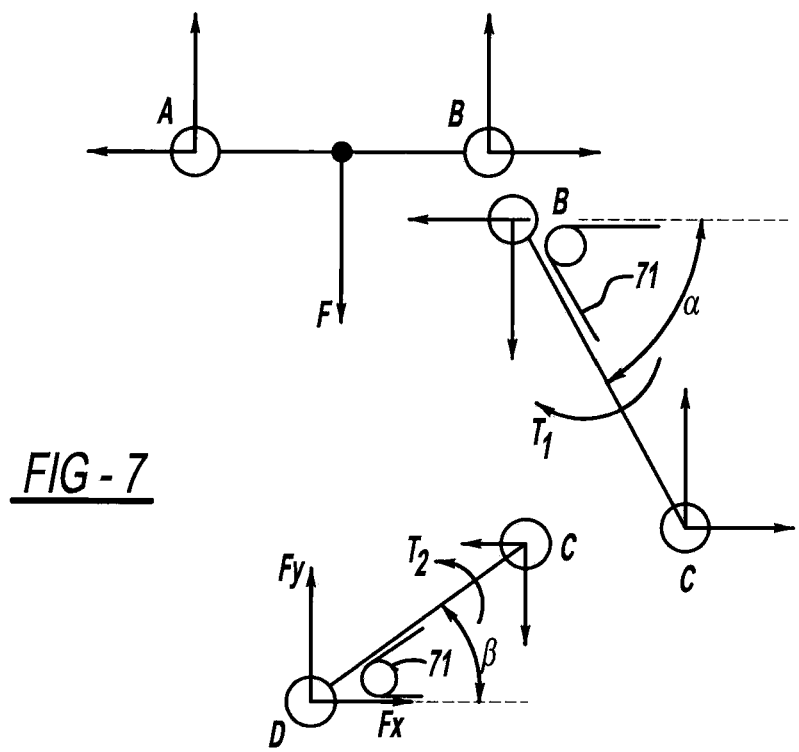
FIG. 7 is a diagrammatic view showing the static force analysis for the jumping mechanism of the jumping robot.
Figure 8:
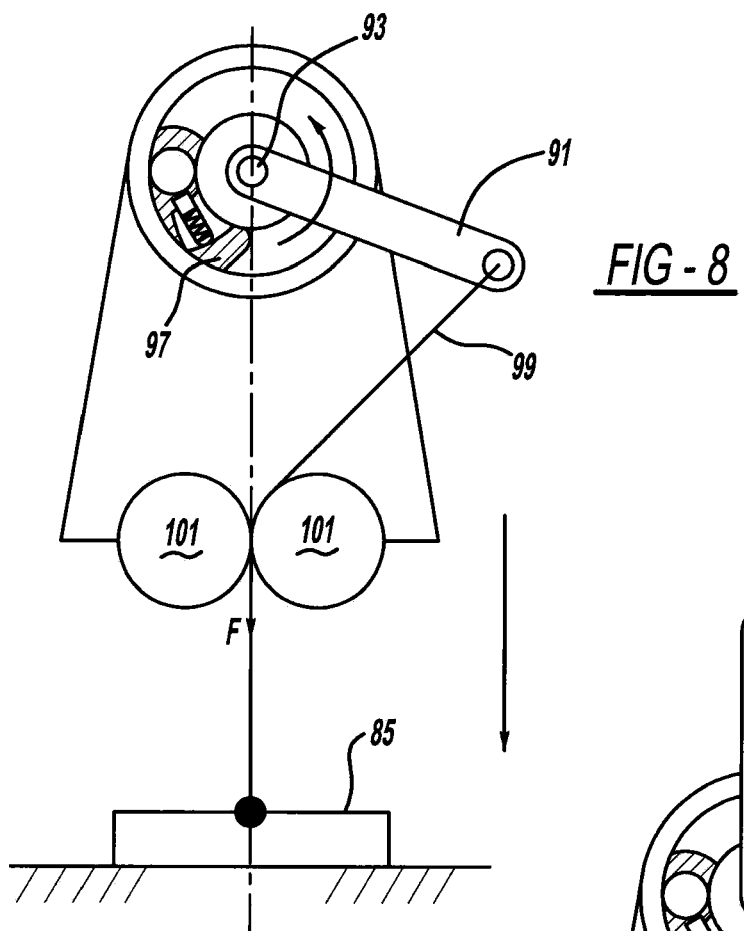
FIGS. 8-10 are a set of diagrammatic views showing a crank and cocking device of the jumping mechanism of the jumping robot.
Figure 9:
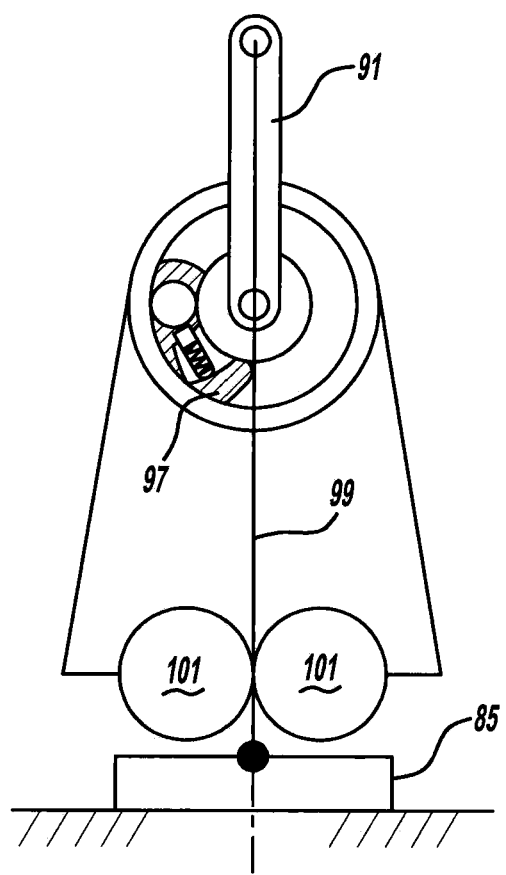
Figure 10:
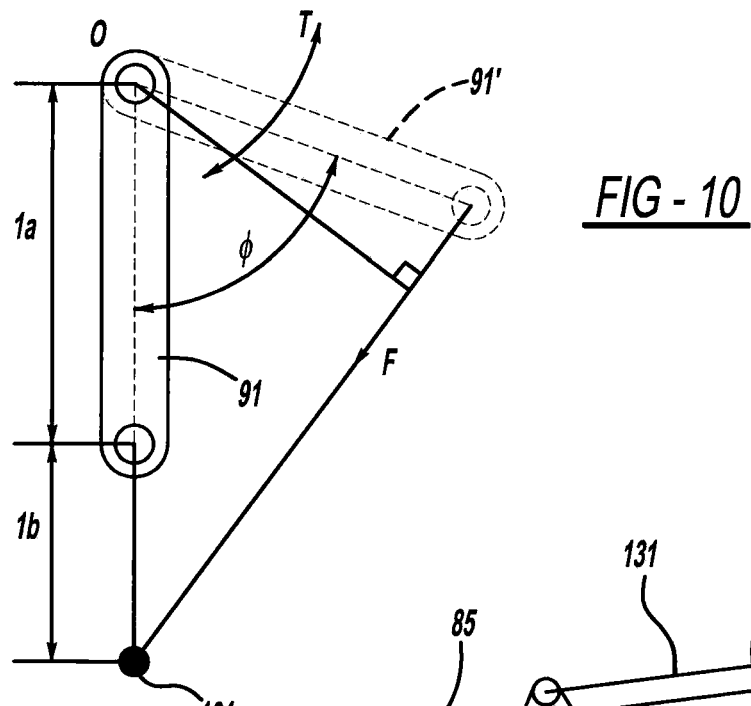

For energy storage, an analysis of how much force F, varying with y, is needed to charge the spring is as follows. Since the mechanism is symmetric with respect to OO', a static analysis for one side is sufficient. Free body diagrams for links AB, BC, and CD are illustrated in FIG. 7, where all the forces are decomposed along the coordinate frame axes. Note that all of the component forces along the same axis, except F, have the same quantity, although the directions may be opposite. $F_x$ and $F_y$ denote the same quantity along the x axis and y axis, respectively. The static equations for the three links are:

$$F = 2F_y$$

$$\tau_1 = 2k\left(\frac{\pi}{2} - \alpha\right) = F_x l_2 \sin\alpha + F_y l_2 \cos\alpha \quad (2)$$

$$\tau_2 = 2k\left(\frac{\pi}{2} - \beta\right) = -F_x l_3 \sin\beta + F_y l_3 \cos\beta \quad (3)$$

where $\tau_1$ and $\tau_2$ are the torques generated by the springs. From above equations, F can be solved as:

$$F = \frac{2kl_3(\pi - 2\alpha)\sin\beta + 2kl_2(\pi - 2\beta)\sin\alpha}{l_2 l_3 \sin(\alpha + \beta)} \quad (4)$$

Note that α and β are functions of y and point C's vertical coordinates $y_c$. Point C is the intersection point of two circles with centers at B: $(l_1/2, y)$ and D: $(l_4/2, 0)$; therefore, $y_c$ can be solved as:

$$y_C = \frac{y}{2} - \frac{y(l_2^2 - l_3^2)}{2e} + \frac{l_d}{4e}\sqrt{[(l_2+l_3)^2 - e][e - (l_2-l_3)^2]} \quad (5)$$

where $e = l_d^2/4 + y^2$ and $l_d = l_4 - l_1$. In fact, there are two intersection points for those two circles, but the point corresponding to the configuration shown in FIG. 6 is unique. Once $y_c$ is obtained, α and β are solved:

$$\alpha = \arcsin\frac{y - y_C}{l_2}, \; \beta = \arcsin\frac{y_C}{l_3} \quad (6)$$

Substituting them into equation (4), F is expressed as a function of y. To facilitate optimization $y_{max}$ and $y_{min}$ are the maximum and minimum value of y. The largest value for $y_{max}$ is $\sqrt{(l_2+l_3)^2 - l_d^2/4}$ when AF and FE, BC and CD are collinear. Although $y_{max} = \sqrt{(l_2+l_3)^2 - l_d^2/4}$, this case is singular, which should be avoided. To simplify the design process, let $$y_{max} = 0.95\sqrt{(l_2+l_3)^2 - l_d^2/4}. \quad (7)$$

Figure 23:
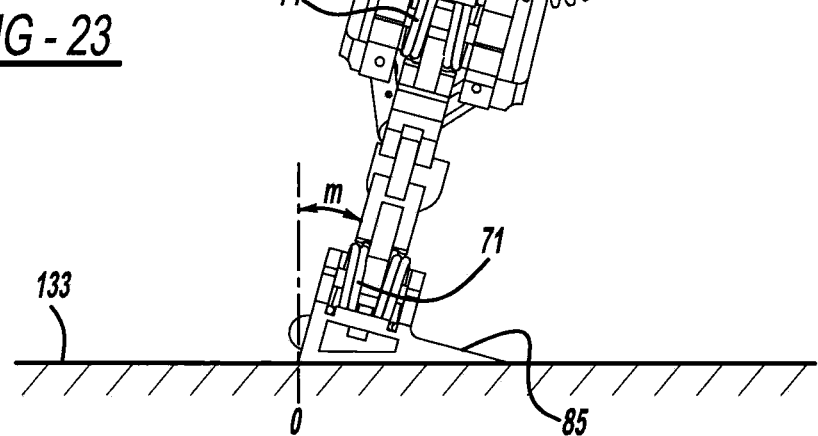
FIGS. 23 and 24 are end elevational views showing the jumping robot in cocked and jumped orientations.

B. Energy Mechanism:

Based on the jumping mechanism, another energy mechanism is needed to store energy in the spring and release it when necessary. Referring to FIGS. 1 and 8-10, a single direction rotation of actuator 41, which is an electric motor, is used for energy storage and release, leading to a short cycle time. This can be achieved by a slip-gear system, an eccentric cam or a variable length crank mechanism. Preferably, a one way bearing is employed. The energy mechanism, shown in an intermediate position in FIG. 8, can apply force F in FIG. 6 and remove it instantly. A rotating link or crank arm 91 is connected to an output shaft 93 of a speed reduction transmission (having rotating gears 95 driven by actuator 41) via a one way bearing 97; therefore, it can only rotate in the counterclockwise direction as illustrated. A cable 99 or other flexible member connects the end of rotation link to the base or foot 85 of the robot, and two pulleys 101 are used for cable guidance. When crank 91 rotates counterclockwisely (as illustrated) from a bottom vertical initial position, cable 99 will be pulled up, and body 33 will be forced to move towards base or foot 85 into a "cocked" and retracted position, as shown in FIG. 23. Once crank 91 passes a top vertical position shown in FIG. 9, the energy will be released due to one way bearing 97, which has internal compression spring biasing.

With such a mechanism, a vertical downward force is applied for energy storage. For optimization this force is related to torque generated by a speed reduction system. This can be achieved by static analysis for crank 91. As can be observed in FIG. 10, $l_a$ is the length of crank 91, $l_b$ is the vertical length from the end of crank 91 to a center of pulley 101, and $\phi \in [0, \pi]$ is the rotation angle. Then the required torque T at angle φ should be equal to the torque generated by F with respect to pivot point O:

$$T = \frac{Fl_a(l_a + l_b)\sin\phi}{\sqrt{l_a^2 + (l_a + l_b)^2 - 2l_a(l_a + l_b)\cos\phi}} \quad (8)$$

Note that F is expressed as a function of y in the static analysis for the jumping mechanism. But y varies with φ and the relation between them is:

$$y = y_{max} - (\sqrt{l_d^2 + (l_a+l_b)^2 - 2l_a(l_a+l_b)\cos\phi} - l_b) \quad (9)$$

Figure 11:
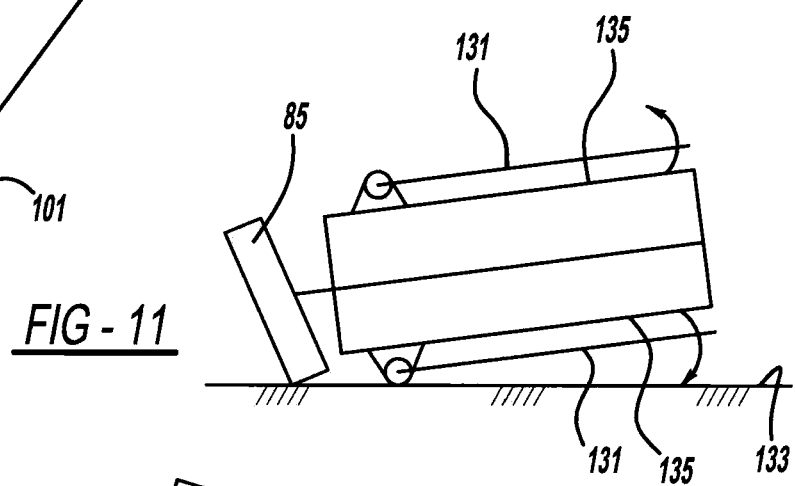
FIGS. 11 and 12 are a set of end diagrammatic views showing the self-righting mechanism of the jumping robot.
Figure 12:
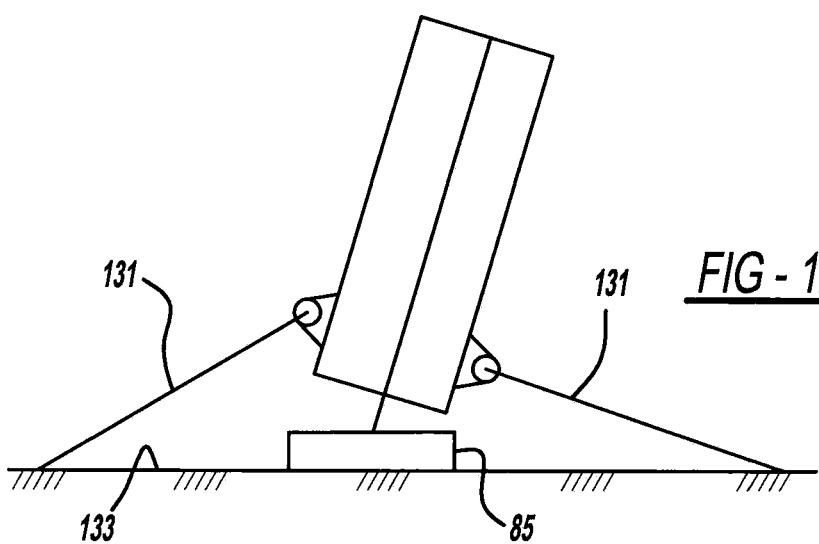

C. Self-Righting Mechanism:

With the above two mechanisms, the robot can jump if the robot initially stands with its foot on the ground. Nevertheless, after the robot jumps into the air and lands on the ground, this optimal orientation may not occur due to the landing impact. Therefore, as illustrated in FIGS. 1, 4, 11-16, and 21; self-righting mechanism 39 is needed to make robot 31 recover from possible side landing orientations. The active self-righting mechanism is based on two active self-righting arms 131. The robot has a generally rectangular external shape, and two side surfaces are significantly larger than the other four end, top and bottom surfaces. As a result, most of the time the robot will contact the ground 133 with one of these two large surfaces after landing. Without a loss of generality, a landing posture as shown in FIG. 11 can be assumed. Self-righting arms 131 are coupled to body and nominally retracted initially parallel to the robot's two largest side surfaces 135. When actuated, arms 131 rotate simultaneously in opposite directions such that an end of the lower arm pushes against ground 133. After a certain amount of arm advancing rotation, the robot can stand up and be ready for the next jump. The final position, when both arms 131 are fully extended, is shown in FIG. 12.

Figure 13:
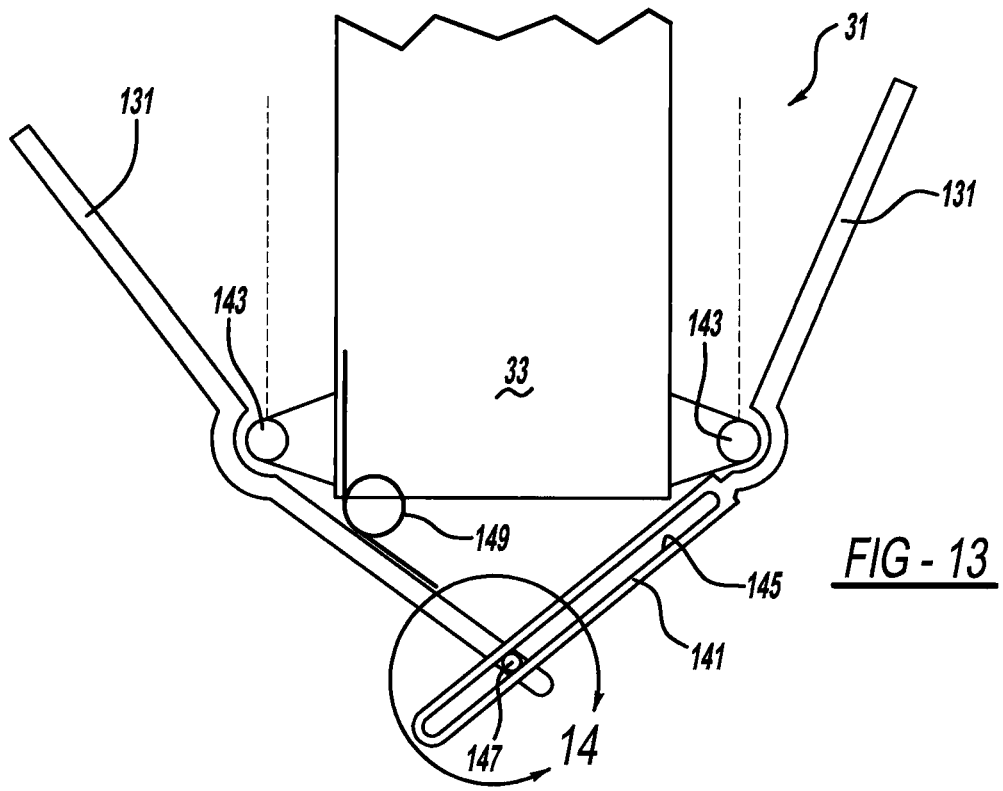
FIG. 13 is an end diagrammatic view showing the self-righting mechanism of the jumping robot.
Figure 14:
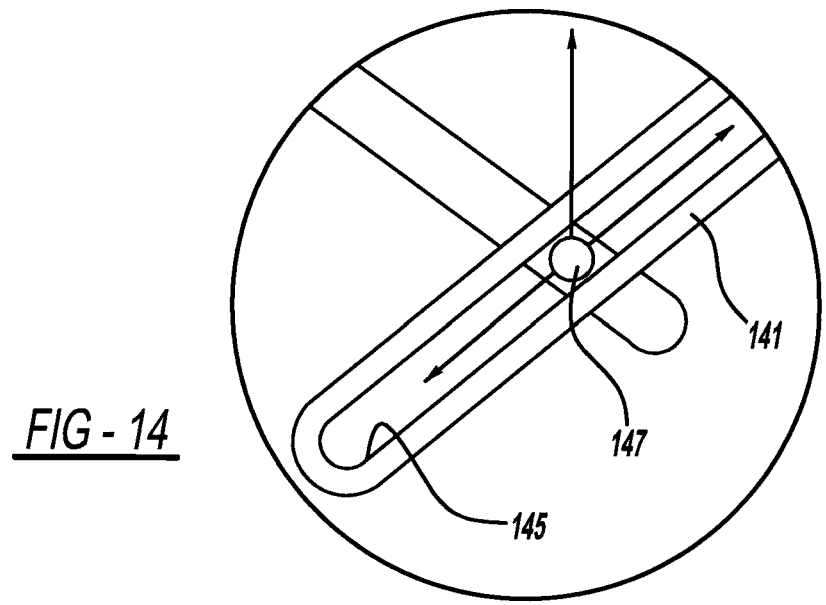
FIG. 14 is an enlarged elevational view, taken within circle 14 of FIG. 13, showing a portion of the self-righting mechanism of the jumping robot.

The details of a driving device 141 are shown in FIGS. 13 and 14. Each arm 131 is connected to body 33 via a revolute joint 143. One arm has an elongated and straight groove or enclosed slot 145, and a follower pin 147 projects adjacent an end of the other mating arm, such that pin 147 slides along groove 145 in a slave-like manner. In this way, if an upward force is applied on pin 147, both arms 131 will rotate but in opposite directions. A torsion spring 149 has one end fixed to body 33 and the other end attached to the adjacent arm 131. If the upward force is removed, then both arms 131 will return to their retracted original positions due to the biasing torque from the single torsion spring 149.

Referring now to FIGS. 1 and 4, robot 31 applies an upward force without using another actuator. Note that body 33 moves towards foot 85 during the energy storage process. With this motion, a protrusion 151 upwardly projects from foot 85 and beneath pin 147, and the upward force will be generated once protrusion 151 contacts pin 147. If the energy is released, the body will move away from the foot; consequently, the upward force is removed when the body is a far enough distance away from the foot. Accordingly, the charge of the spring and the self-righting mechanism can be performed simultaneously because the motion from the charge of the spring is used for self-righting. This coupling motion advantageously reduces the cycle time for jumping. Again, all the motion can be advantageously accomplished with one directional rotation of single electromagnetic actuator 41.

D. Steering Mechanism:

The final mechanism to realize the jumping motion sequence is steering mechanism 37, which can change the jumping direction without requiring an additional actuator. The steering mechanism is based on the speed reduction transmission in the energy mechanism. Since all the above-mentioned motions can be achieved using one directional rotation, the steering mechanism can be actuated by the same multi-functional motor actuator 41, but with rotation in another direction.

Figure 17:
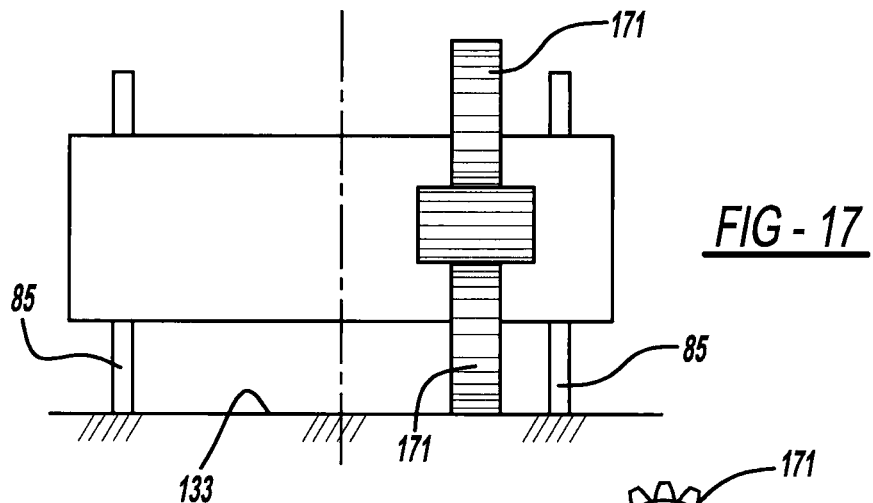
FIG. 17 is a front diagrammatic view showing the steering mechanism of the jumping robot.
Figure 18:
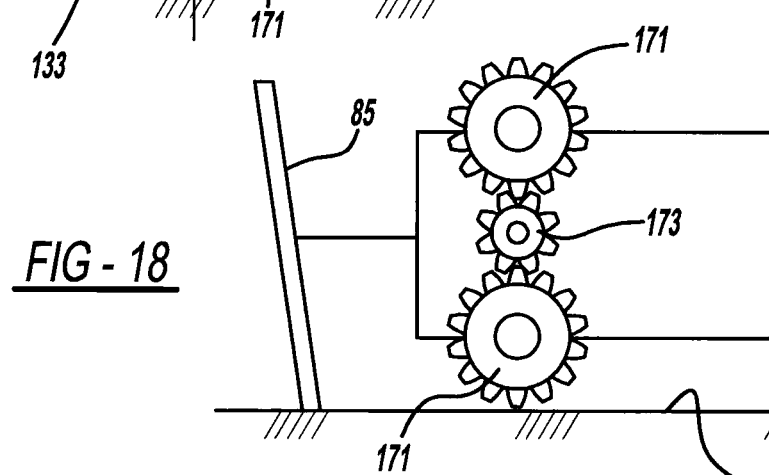
FIG. 18 is a side diagrammatic view showing the steering mechanism of the jumping robot.
Figure 19:
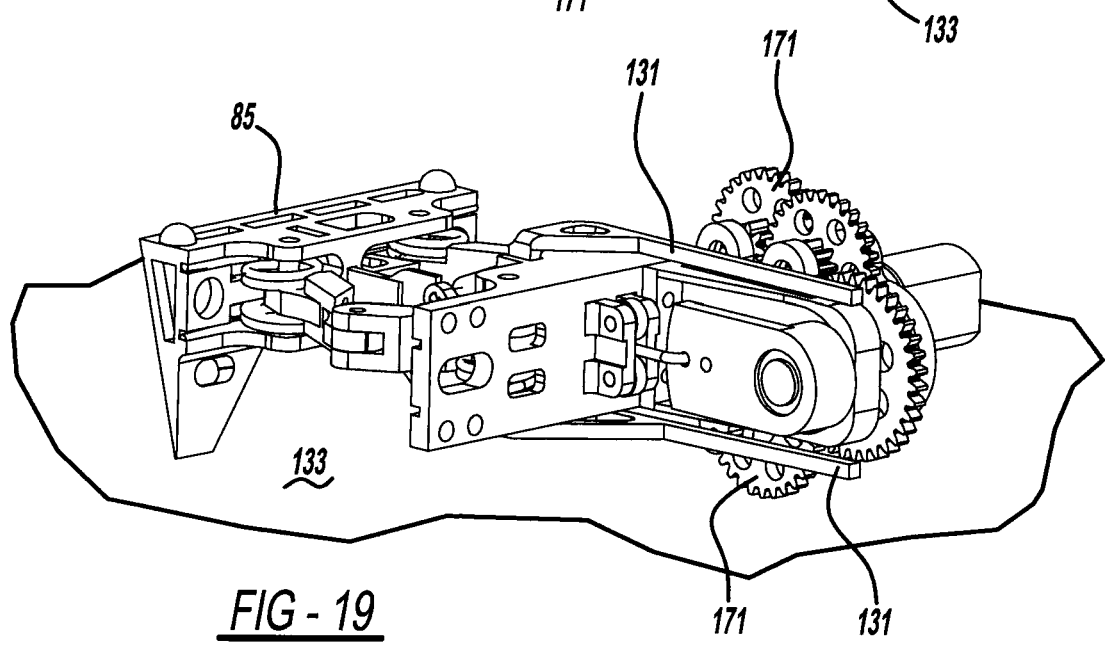
FIGS. 19 and 20 are perspective views showing the jumping robot in various steered orientations.
Figure 20:
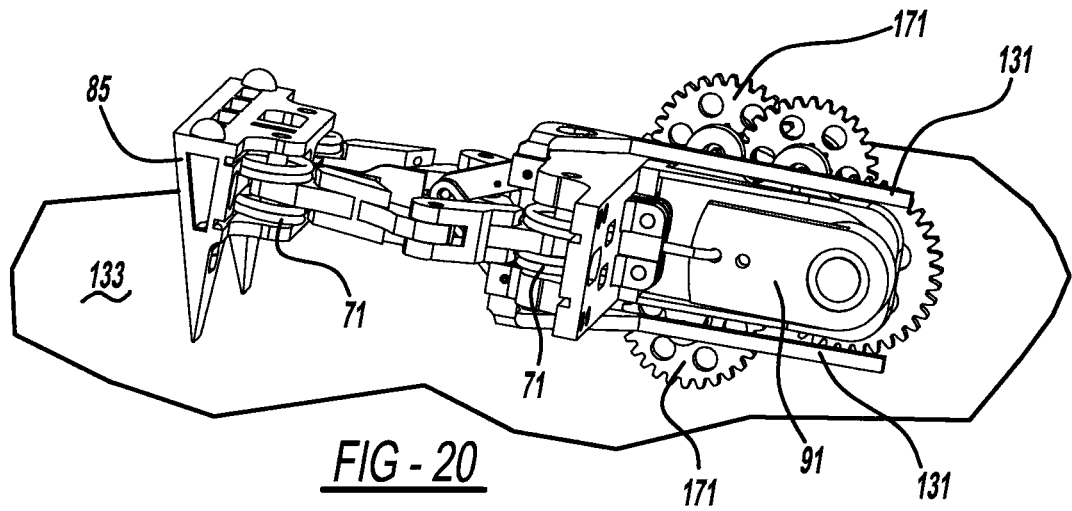
Figure 21:
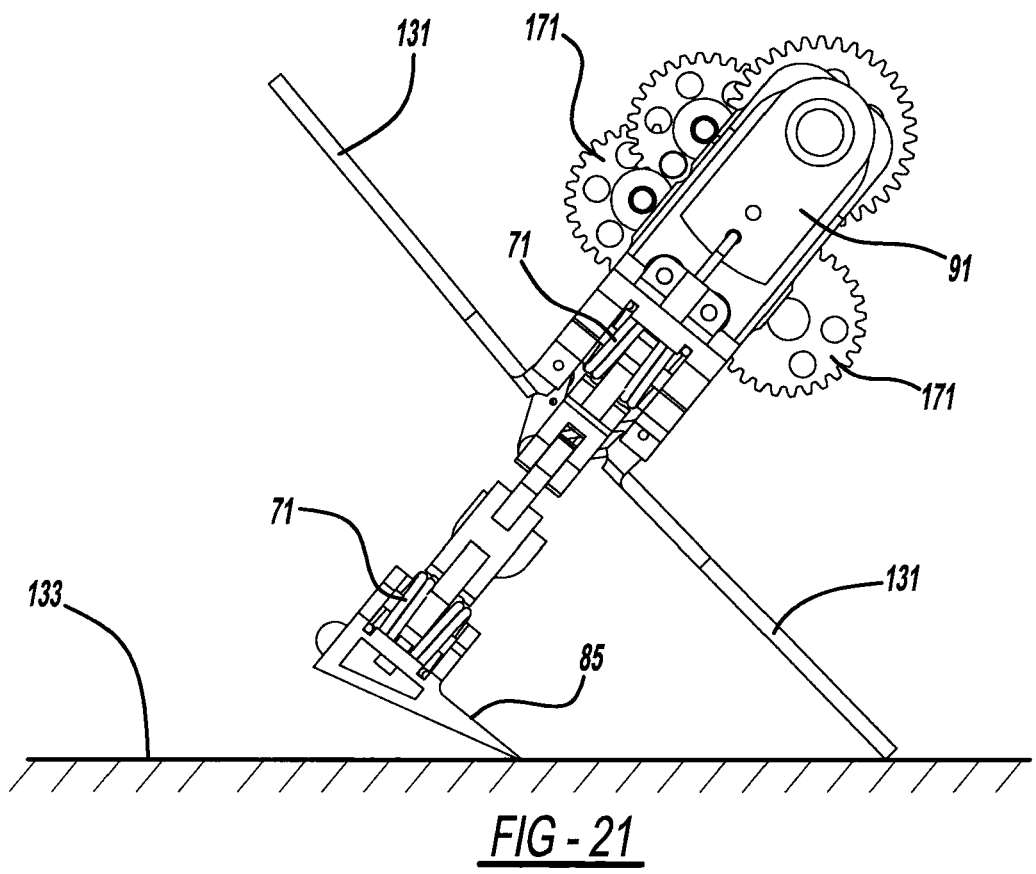
FIGS. 21 and 22 are end elevational views showing the jumping robot in various self-righted orientations.
Figure 22:
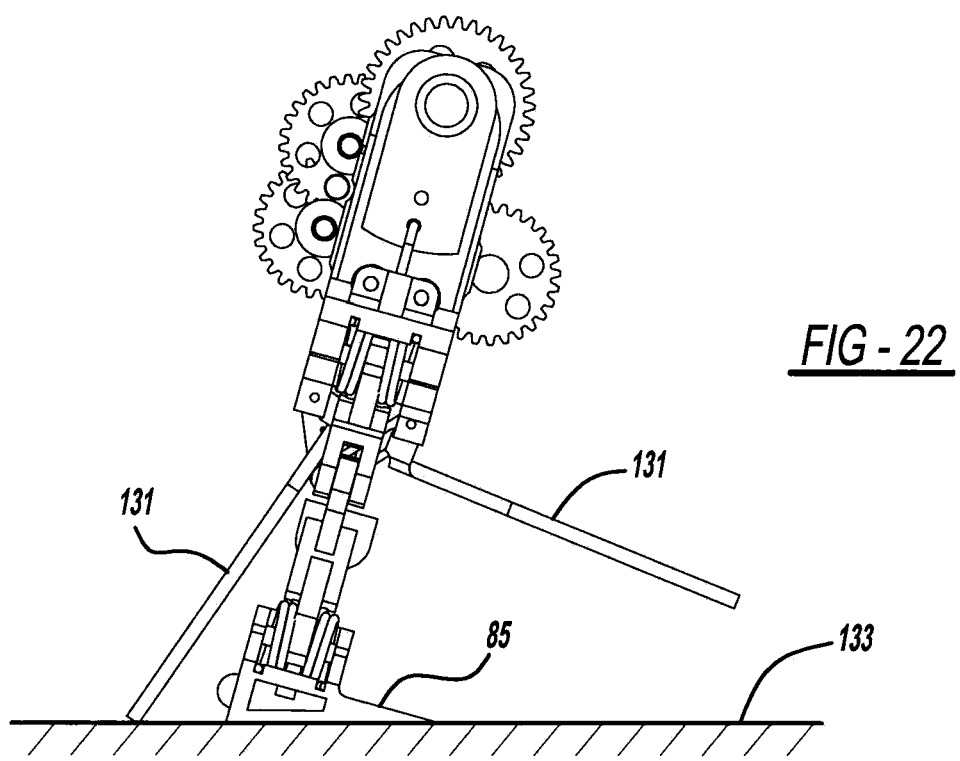

FIGS. 5, 17 and 18 show two steering gears 171 placed symmetrically about an output pinion gear 173 driven by actuator 41. As discussed with regard to the self-righting mechanism, the robot will contact ground 133 with one of its two largest surfaces when it lands. In this case, peripheral teeth of one of the two steering gears 171 will touch ground 133. Therefore, once motor 41 (see FIG. 1) rotates and causes steering gear 171 to act as a traction wheel pulling itself along the ground while foot 85 serves as an offset anchor, the robot will change its heading direction. Note that one of the two steering gears is also used in the speed reduction transmission. If the motor actuator 41 rotates in one direction, steering gear 171 is used for charge of the spring and self-righting. If the motor 41 rotates in the other direction, crank 91 (see FIG. 1) will not rotate because of the one-way bearing. In this case, this gear 171 is used for steering. This steering gear approach allows for steering speeds greater than twenty degrees per second and more preferably, equal to or greater than thirty-six degrees per second.

Alternately, a single large gear at the end of the speed reduction transmission acts as the steering gear. Due to its large diameter, the alternate steering gear touches the ground beyond the outer robot surfaces regardless of which largest surface of the robot contacts the ground. This method, although simpler, has a slow steering speed because the angular velocity of the large gear is small. The preferred design, however, solves this disadvantage by using two gears next to the motor output pinion gear so that their angular velocities are larger.

E. Optimal Design of Jumping Mechanism and Energy Mechanism:

With the jumping mechanism and the energy mechanism, if the same energy in the spring can be charged with a small peak value of torque T generated by the speed reduction system, then the weight and size for the speed reduction system can be reduced. Therefore, mechanism optimization is desirable to minimize the peak value of T. The optimal design calculations are set forth as follows. The optimization is achieved following the procedure of identifying the optimization variable, formulating the objective function, obtaining the constraints, and solving the constrained optimization problem. To perform an optimal design, the optimization variables should be first identified. Substituting force equation (4) into the torque equation (8):

$$T = \frac{2kl_a(l_a + l_b)\sin\phi[l_3(\pi - 2\alpha)\sin\beta + l_2(\pi - 2\beta)\sin\alpha]}{l_2 l_3 \sin(\alpha + \beta)\sqrt{l_a^2 + (l_a + l_b)^2 - 2l_a(l_a + l_b)\cos\phi}} \quad (10)$$

from which there are eight parameters $k$, $l_a$, $l_b$, $\alpha$, $\beta$, $l_2$, $l_3$, and $\phi$. Since $\alpha$ and $\beta$ are related to $y$ and $y_c$ through equation (6) and $y_c$ is in turn related to y, $l_2$, $l_3$, and $l_d$ via equation (5), the true parameters are $k$, $l_a$, $l_b$, $y$, $l_2$, $l_3$, $l_d$ and $\phi$.

Among the above eight parameters, the variables will be only $l_b$, $l_2$, $l_3$, $l_d$, and $\phi$. In other words, $k$, $l_a$, and $y$ are either constants or can be obtained from $l_1$, $l_2$, $l_3$, $l_d$, and $\phi$. Furthermore, the torsion springs are chosen to have a constant $k$=58.98 Nmm/rad (preferably obtained from McMaster Carr as part no. 9287K77). Moreover, $l_a$ is represented as a function of $l_2$, $l_3$, and $l_d$ as will be shown in what follows. Let $y_{min}$ be the final minimum distance for y when the spring is fully charged, then $l_a = (y_{max} - y_{min})/2$. Since $y_{max}$ is related to $l_2$, $l_3$, and $l_d$ as shown in equation (7), $y_{min}$ can also be expressed as a function of them if the initial energy $E_0$ is known. Based on the simulations, to achieve one meter jumping height with a 75° take-off angle, the initial energy should be 0.3 J. But to leave some margin, let the initial energy be $E_0$=0.4 J. Then $y_{min}$ can be obtained from:

$$E_0 = 2k\left[\left(\frac{\pi}{2} - \alpha_1\right)^2 - \left(\frac{\pi}{2} - \alpha_2\right)^2 + \left(\frac{\pi}{2} - \beta_1\right)^2 - \left(\frac{\pi}{2} - \beta_2\right)^2\right] \quad (11)$$

where $\alpha_1$ and $\beta_2$ are the minimum angles for $\alpha$ and $\beta$ when $y=y_{min}$ in equations (5) and (6), and $\alpha_2$ and $\beta_2$ are the maximum angles when $y=y_{max}$. Note that an analytical expression for $y_{min}$ is unavailable because of the trigonometric items; however, a numerical solution can be obtained once $l_2$, $l_3$, and $l_d$ are given. Therefore, $l_a$ can be obtained from $l_2$, $l_3$, and $l_d$. Finally, y can also be derived from $l_2$, $l_3$, and $l_d$ through equation (9). Based on the preceding, T is only a function of $l_b$, $l_2$, $l_3$, $l_d$, and $\phi$ it is denoted as $T(l_b, l_2, l_3, l_d, \phi)$. The optimization variables are only $l_b$, $l_2$, $l_3$, and $l_d$ because $\phi$ will run from 0 to $\pi$ during each energy charge cycle.

Having identified the optimization variables, the next step is to formulate an objective function. Given $l_b$, $l_2$, $l_3$, and $l_d$ a torque curve as $\phi$ running from 0 to $\pi$ can be plotted. The goal is to find the optimal $l_b$, $l_2$, $l_3$, and $l_d$ such that the resulting curve has the property that the largest torque in the curve is minimum among all possible curves. In this case, the objective function is the peak torque in the curve for given $l_b$, $l_2$, $l_3$, and $l_d$, which can be defined by:

$$g(l_b, l_2, l_3, l_d) = \max_{\phi \in [0,\pi]} T(l_b, l_2, l_3, l_d, \phi) \quad (12)$$

The next step is to obtain the constraints for the optimization variables. The lengths of $l_2$ and $l_3$ should not be too small, otherwise, it cannot hold the torsion springs. At the same time, they cannot be too large because of the size limit of the robot. Therefore, with practical consideration, assume 15 mm≤$l_2$, $l_3$≤20 mm. With similar implementation reasons, other linear constraints for $l_b$ and $l_d$, and the optimization can be formulated as:

minimize $g(l_b, l_d, l_2, l_3)$ subject to $7 \le l_b \le 12, -5 \le l_d \le 5, 15 \le l_2 \le 20, 15 \le l_3 \le 20$ (13)

where the omitted length unit is millimeters. To solve the constraint optimization problem, the numerical method is implemented in Matlab because the analytical expression for $g(l_b, l_a, l_2, l_3)$ cannot be obtained. The optimization is performed by dense discretization of $\phi$ and evaluating the value at the resulting points. The constrained nonlinear multivariable function in the Optimization Toolbox is employed to find the optimal value. Since the method can only obtain the local minimum, various random initial points are chosen to run the optimization. The optimization results are the same for these initial points, and the optimal values for the mechanisms are $l_b$=7 mm, $l_d$=1.2 mm, $l_2$=15 mm and $l_3$=20 mm. The other parameters can be calculated accordingly: $y_{max}$=33.3 mm, $y_{min}$=11.7 mm, and $l_a$=10.8 mm. To avoid interference between the two revolute joints at the foot, let $l_1$=18 mm, then $l_4 = l_1 + l_d = 19.2$ mm.

F. Optimal Design of the Self-Right Mechanism:

The self-righting mechanism is designed to successfully recover from any landing posture. The design variables include the arm length and the range of arm rotation angle.

Figure 15:
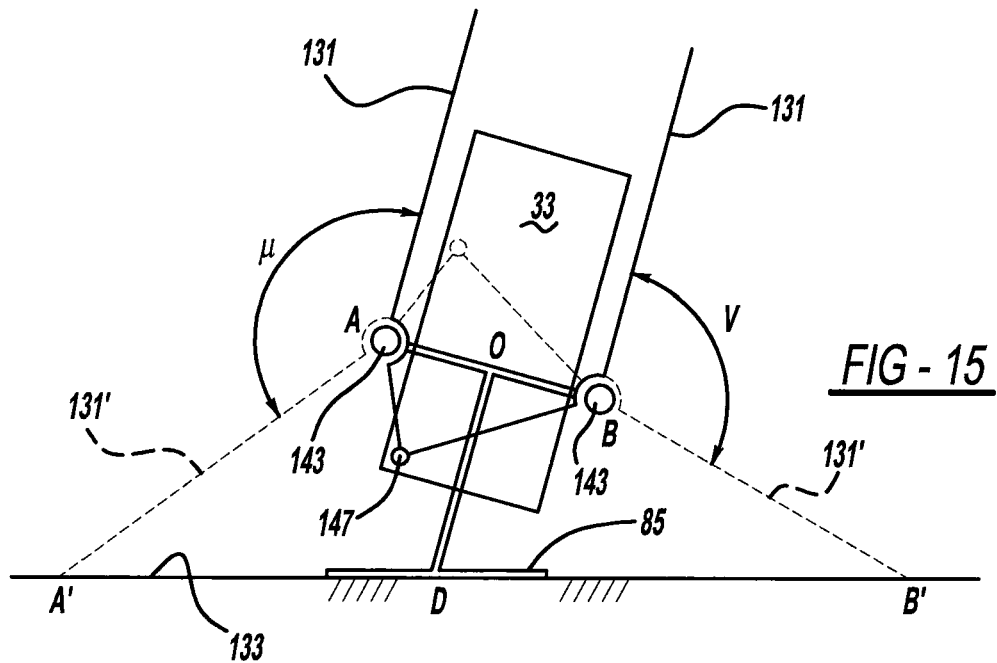
FIG. 15 is a diagrammatic end view showing the self-righting mechanism of the jumping robot.

The initial and final positions for both recovery arms 131 are shown in FIG. 15. The initial positions, shown in solid lines, are parallel to body 33, and the final positions, shown with dashed lines, contact ground 133 with arm ends A' and B'. The ranges of arm rotation angle are denoted by μ and ν for the left and right arms 131, respectively. O is the middle point for AB. Moreover, AB⊥OD and ∠ODB'=θ=75°, is the robot take-off angle. The relation between the arm length and range of arm rotation angle can be obtained as:

$$\frac{|AA'|}{\sin(\pi-\theta)} = \frac{|OD|+|AO|\tan(\pi/2-\theta)}{\sin(\mu-\pi+\theta)} \quad (14)$$

$$\frac{|BB'|}{\sin\theta} = \frac{|OD|-|AO|\tan(\pi/2-\theta)}{\sin(\nu-\theta)} \quad (15)$$

From above equations, if μ or ν is large, then the arm length AA' or BB' will be small. To simplify the design, μ=135° and ν=105° are fixed. Such a choice is made to let the difference between μ and ∠ODA', ν and ∠ODB' be 30°. Then |AA'| and |BB'| be solved from about two equations based on |AB| and |OD|. Note that both |AB| and |OD| are determined from real implementation.

Figure 16:
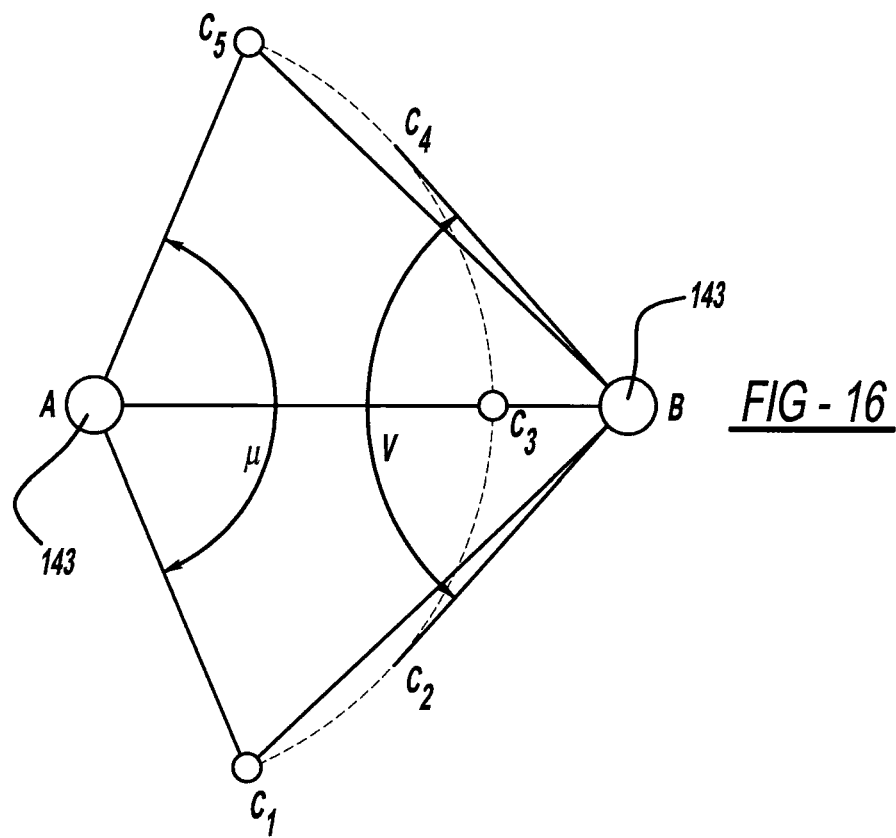
FIG. 16 is a diagrammatic view showing the self-righting mechanism of the jumping robot.

The next step is to design the length of AC shown in FIG. 13, so that the desired angle ranges can be achieved. The mechanism can be simplified as shown in FIG. 16, where $C_1$ to $C_5$ are different locations for the end point C of crank AC. $C_1$ and $C_5$, symmetric with respect to AB, are the limit position for crank AC, and $\angle C_1AC_5=\mu=135°$. $C_2$ and $C_4$, symmetric with respect to AB as well, are the tangent points from point B to the circle formed by crank AC and $\angle C_2BC_4=\nu=105°$. Right-angled triangle $ABC_4$ produces $|AC|=|AB|\sin(\nu/2)$. The parameters for the right arm 131 can also be derived accordingly. For example, the maximum length of the right arm 131 is $$|BC_1| = \sqrt{|AB|^2 + |AC|^2 - 2|AB||AC|\cos(\mu/2)}. \quad (16)$$

Turning to FIGS. 1, 5 and 13, the bottom of base 85 is designed with a tilt angle m of 15° to provide a 75° take-off angle, however, an angle m of between 5°-45° may also be suitable. The major part of the energy mechanism, is the motor-actuated gear train for the speed reduction transmission. The motor 41, preferably obtained from Gizmoszone as part no. GH810136V3, has a no load rotational speed of about 100 RPM for 3 volts.

A three-stage gear train connects an output shaft of motor actuator 41 to crank 91. The gear train is made up of output pinion gear 173 with 8 teeth, compound steering gear 171 with 28/8 teeth, another compound gear 251 with 28/9 teeth, and spur gear 95 with 35 teeth. Therefore, the preferred total speed reduction ratio is 47.6. At both ends of each shaft, a set of miniature ball bearings are used to reduce the friction of the associated gears. Moreover, guidance pulleys 101 are also a set of miniature ball bearings. The robot is preferably powered by a 50 mAh FullRiver LiPo battery 53 (see FIG. 2) with 3.7 voltage output. Since the energy mechanism is placed on one side of the body, the battery is placed on the other side to balance the weight. Most of the parts of the robot are fabricated using a 3D printing technology called Selective Laser Sintering ("SLS"). The material for SLS is preferably a DuraForm HST composite from 3D Systems, which is fiber-reinforced and can be used for functional prototypes. Alternately, other engineering grade polymers or mechanical manufacturing methods can be used to produce the robotic components such as the body, arms, legs, foot and gears.

Figure 24:
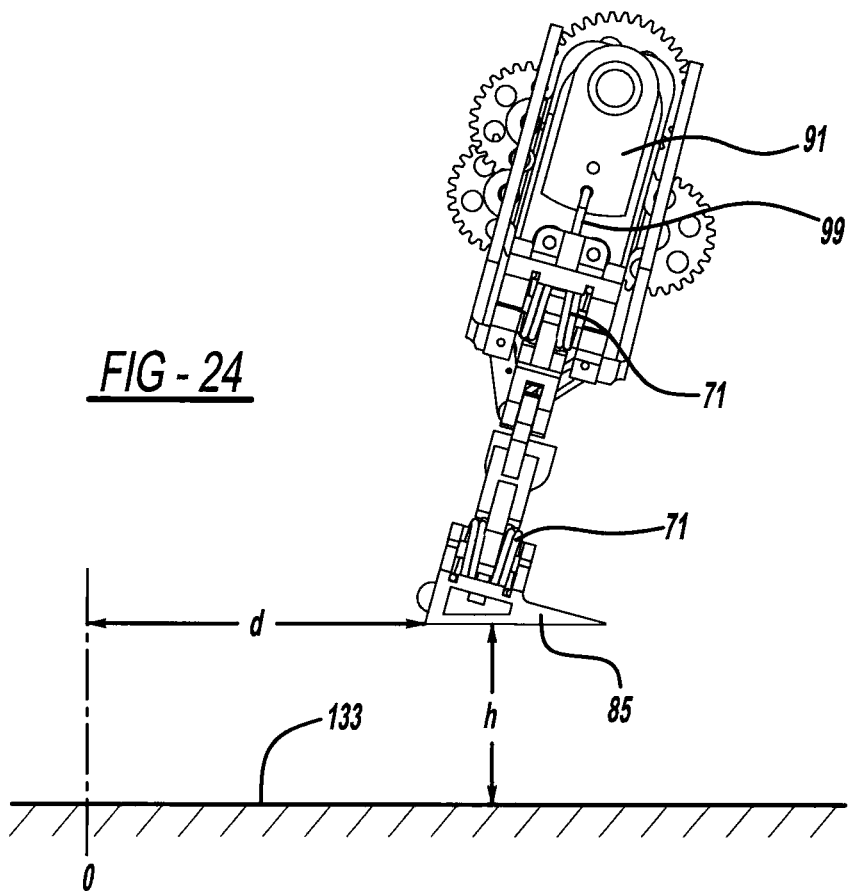
Figure 25:
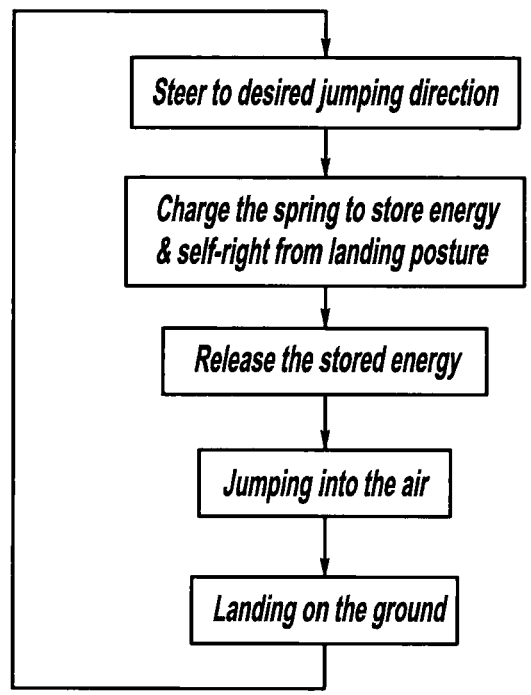
FIG. 25 is a flow diagram showing a cycle of the entire jumping motion of the jumping robot.

Comparing FIGS. 23 and 24, the jumping performance (considering air resistance) is at least 20 cm high (h), and more preferably h=at least 55 cm and d=78 cm, and most preferably h=98 cm and d=103 cm. It is envisioned that the present robot will also have the following characteristics: (a) a mass or weight of less than 50 grams and more preferably 23.5 grams; (b) a maximum linear dimension (L) less than 10 cm and more preferably 6.5 cm (see FIG. 3); and (c) can jump more than 100 times, and more preferably approximately 285 times on a single 50 mAh battery charge. The entire motion cycle for each jumping is summarized in the flow diagram of FIG. 25.

Figure 29:
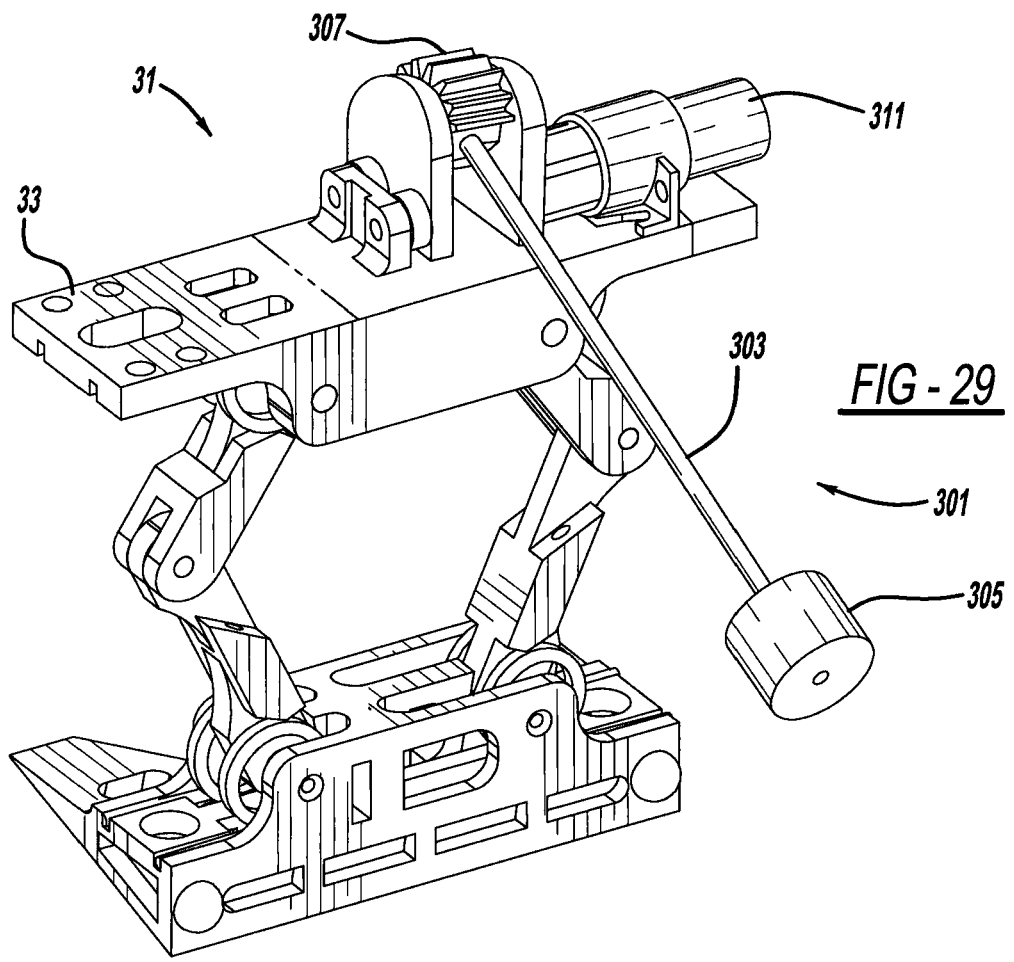
FIG. 29 is a perspective view, opposite that of FIG. 1, showing a tail assembly employed in another embodiment of the jumping robot.
Figure 30:
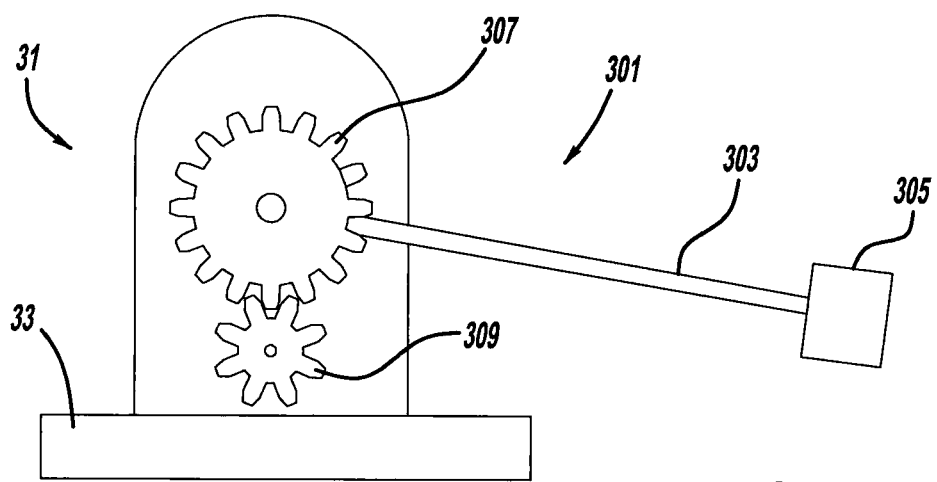
FIG. 30 is a diagrammatic end view showing the tail assembly employed in the jumping robot embodiment of FIG. 29.

G. Tail Assisted Orientation Control:

Referring to FIGS. 29 and 30, a tail 301 includes an elongated rigid link or rod member 303 with negligible mass, and an enlarged weight or ballast 305 attached adjacent a distal end thereof. The other end of rod 303 is rigidly connected to a rotor or tail gear 307, for movement therewith, which engages and is driven by a smaller diameter motor output gear 309. A small, fractional horsepower, electric tail motor 311 drives motor gear 309 through its central axis. In this way, movement of tail 301 is controlled by controlling the motor's rotation. If the air resistance is negligible, the angular momentum of robot 31 in mid-air is a constant. Therefore, if tail 301 rotates, robot body 33 will also rotate to conserve the angular momentum. Accordingly, a pitch angle of jumping robot 31 is automatically controlled by rotating tail 301.

Figure 31:
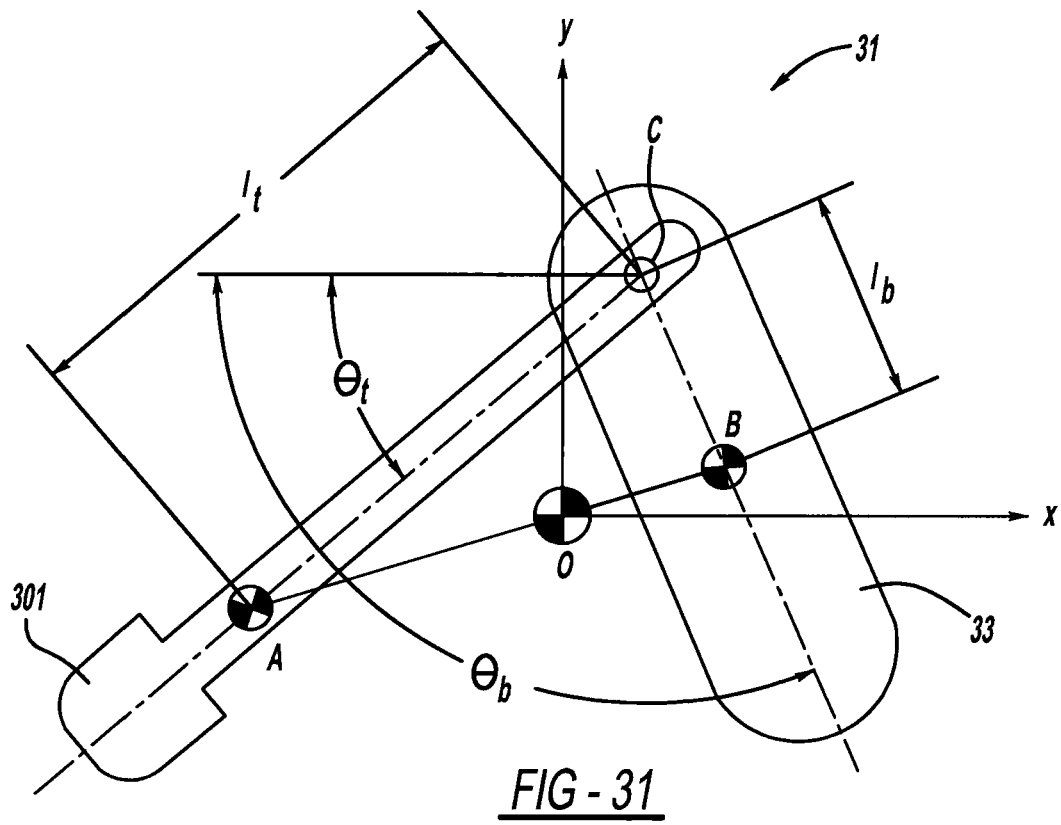
FIG. 31 is a diagrammatic end view showing the tail assembly employed in the jumping robot embodiment of FIG. 29.

A schematic diagram of robot 31 in the air is shown in FIG. 31, where robot 31 is represented as body 33 or 'B' and tail 301 or 'A' is connected at an active revolute joint at point 'C'. The mass for body 33 and tail 301 are denoted as $m_b$ and $m_t$, respectively. Furthermore, the body angle and tail angle with respect to a horizontal line are labeled as $\theta_b$ and $\theta_t$, respectively. The center of mass for the tail, body, and whole robot are at points A, B, and O, respectively. Moreover, a length for link AC and link BC are $l_t$ and $l_b$, respectively. As shown, a coordinate system OXY is established with the origin at the robot's center of mass, X axis along the horizontal direction, and Y axis along the vertical direction. The moment of inertial is designated as $I_t$ and $I_b$ for the tail and body, respectively. During the jumping motion, the system's angular momentum will be reserved. Thus, if tail 301 rotates in a clockwise direction, then body 33 rotates in the counterclockwise direction to conserve the angular momentum. In other words, the pitch angle $\theta_b$ is automatically controlled by swinging tail 301.

Using a Lagrangian formulation, a dynamics equation is obtained for jumping robot 31, illustrated in FIGS. 29-31, as follows:

$$M\ddot{\theta}_t - L\cos\theta_m\ddot{\theta}_b + L\sin\theta_m\dot{\theta}_b^2 = \tau \quad (17)$$

$$N\ddot{\theta}_b - L\cos\theta_m\ddot{\theta}_t - L\sin\theta_m\dot{\theta}_t^2 = -\tau \quad (18)$$

where $$M = I_t + \frac{m_t m_b l_t^2}{m_t + m_b}, \quad N = I_b + \frac{m_t m_b l_b^2}{m_t + m_b}, \quad (19)$$

$$L = \frac{m_t m_b l_t l_b}{m_t + m_b}, \quad \theta_m = \theta_b - \theta_t,$$

and τ is the torque generated by motor 311. Since there is only one control input, both $\theta_b$ and $\theta_t$ are not simultaneously controlled. Thus, to eliminate one variable from the equation, the total angular momentum for the system is used which is:

$$H_0 = (M - L\cos\theta_m)\dot{\theta}_t + (N - L\cos\theta_m)\dot{\theta}_b \quad (20).$$

With the previous two equations, the dynamics equation for $\theta_m$ is obtained as follows:

$$\ddot{\theta}_m = \frac{(M - L\cos\theta_m)(N - L\cos\theta_m)L\sin\theta_m\dot{\theta}_m^2 + L\sin\theta_m H_0^2}{(MN - L^2\cos^2\theta_m)(M + N - 2L\cos\theta_m)} - \frac{M + N - 2L\cos\theta_m}{MN - L^2\cos^2\theta_m}\tau. \quad (21)$$

With the dynamics equation, a controller is designed for the system to automatically generate the appropriate $\tau$ so that the angle $\theta_b$ is stabilized at a desired angle.

A dynamics equation is also used to analyze the required time to reach a desired angle. In this case, the motor is considered to be under a constant voltage supply. Then the dynamics equation can be rewritten as:

$$\ddot{\theta}_m = \frac{(M - L\cos\theta_m)(N - L\cos\theta_m)L\sin\theta_m\dot{\theta}_m^2 + L\sin\theta_m H_0^2}{(MN - L^2\cos^2\theta_m)(M + N - 2L\cos\theta_m)} - \frac{M + N - 2L\cos\theta_m}{MN - L^2\cos^2\theta_m}\tau_s\left(1 - \frac{\dot{\theta}_m}{\omega_n}\right) \quad (22)$$

where $\tau_s$ is the stall torque and $\omega_n$ is the no-load angular velocity for motor 311 under the voltage supply. Solving the equation, the trajectory is estimated for $\theta_m$. For example, with body 33 being about 25 grams, if tail weight 305 has a point mass of three grams at the end of a six centimeters long rod 303, the relative angle $\theta_m$ increases 90 degrees in 0.1 second.

Figure 27:
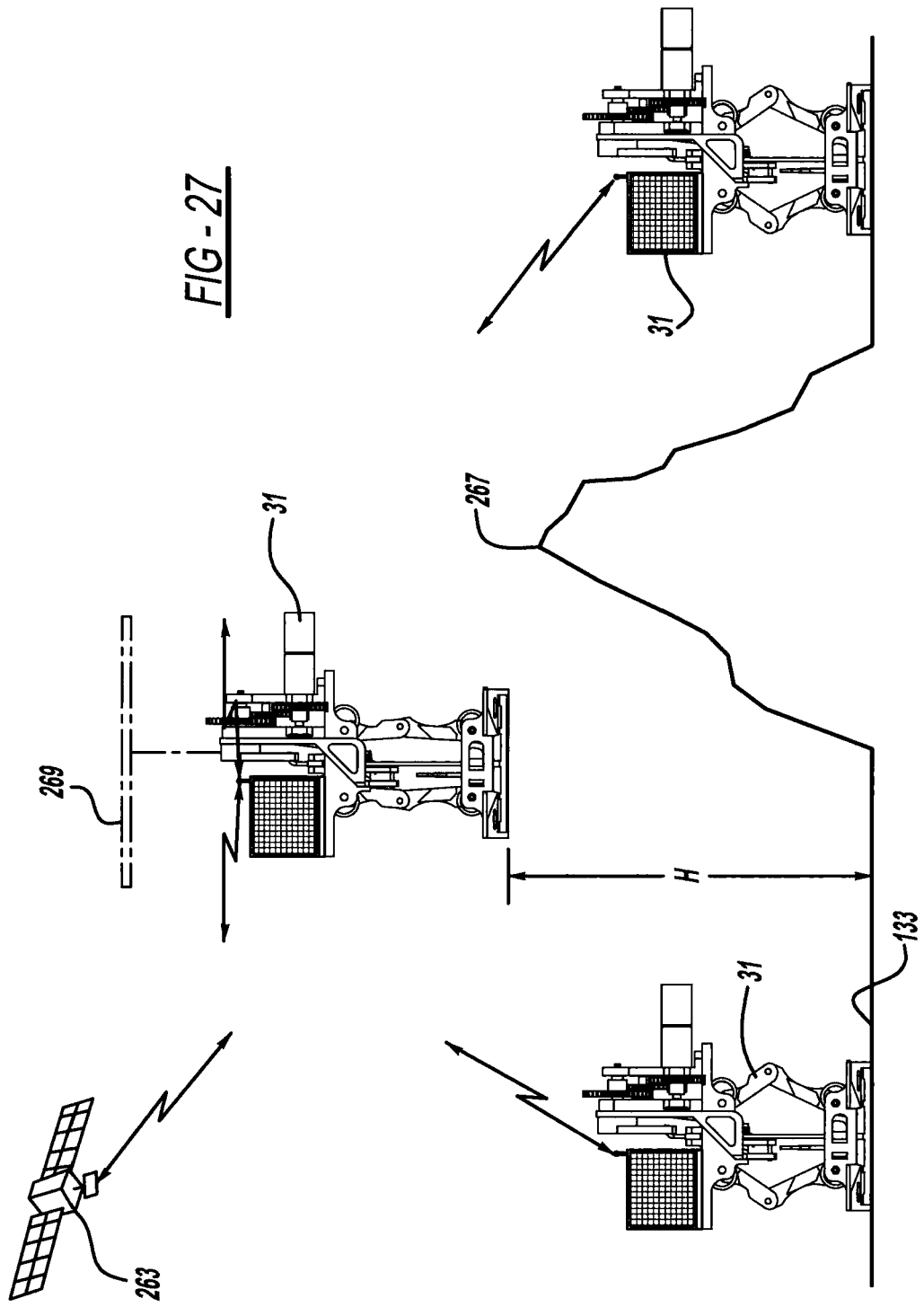
FIG. 27 is a side elevational view showing an array of the jumping robots.
Figure 32:
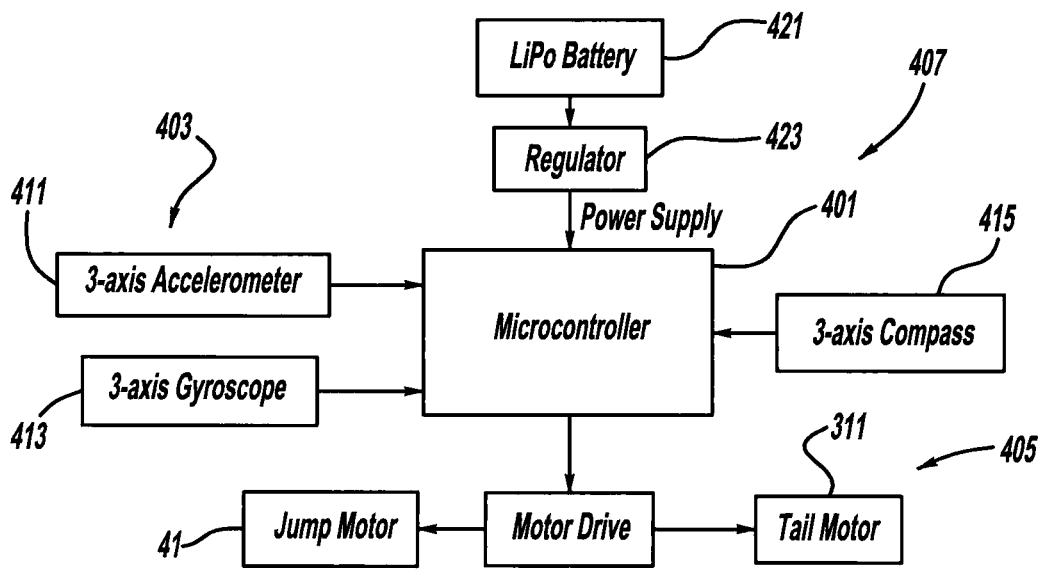
FIG. 32 is a schematic diagram of a control system employed in the jumping robot embodiment of FIG. 29.

To control the robot with the tail option, an embedded and automated control system is designed with the schematic of FIG. 32. The whole system can be divided into four parts: a central processing unit 401, a sensing unit 403, an actuation unit 405, and a power supply unit 407. Central processing unit 401 includes a microcontroller (for example, part no. ATmega128RFA1 from Atmel Corp.), which is integrated with a 2.5 GHz Zigbee transceiver. The two-way data transmission between a base station and robot 31 can be ensured with this microcontroller. The power consumption for such transmission will be low because a Zigbee protocol is employed. Moreover, the set of robots 31 (as shown in FIG. 27) will be able to communicate to each other to form a mobile sensor network.

Sensing unit 403 includes a three axis accelerometer 411, a three axis gyroscope 413, and a three axis magnetic compass 415. A single chip is employed for the preceding two sensors (for example, Model No. MPU-6050 from InvenSense, Inc.), while compass 415 is another chip (such as Model No. HMC5883L from Honeywell Inc.). With the accelerometer and gyroscope, a closed loop and automated, real-time feedback control for mid-air maneuvering can be achieved. Specifically, accelerometer 411 detects the free fall, while gyroscope 413 provides feedback of the body's angle to controller 401. Compass 415 is employed to determine the robot's heading direction when the robot lands on the ground.

Actuation unit 405 includes one or more motor drivers with pulse width modulation ("PWM") ability. In the preferred version, a dual H-Bridge DC motor driver (Model No. MC34933 from Freescale Semiconductor, Inc.) controls both jump motor 41 and tail motor 311. With the PWM ability, commands from the microcontroller control the voltage on the motors, thereby dictating the motor speed.

Figure 33:
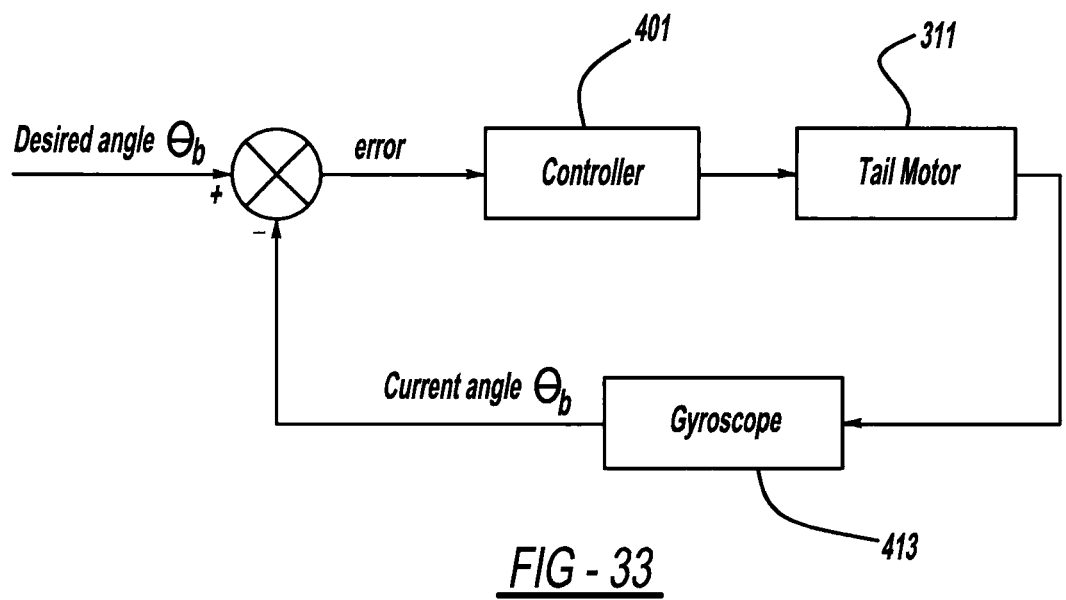
FIG. 33 is a schematic diagram of the closed-loop control logic for the tail assembly employed in the jumping robot embodiment of FIG. 29.

Robot 31 is powered by a small battery 421 (also shown as 53 in FIG. 2) such as the FullRiver 50 mAh LiPo battery. The voltage from the battery is regulated to 3.3 V by a regulator 423 to power the entire robot 31. Although the embedded control system has all the required functions, all of the components are contained in a small package with a printed circuit board size of 22.8 mm by 24.8 mm, or less. Furthermore, the total weight for this circuit board is less than three grams. The closed loop control for the mid-air maneuvering can be accomplished with the embedded control system. The detailed closed loop system is illustrated in FIG. 33, and a proportional-derivative ("PD") controller or other nonlinear controllers can stabilize the angle $\theta_b$ at a desired value.

The tail can only rotate about one axis to control the robot's pitch angle in the illustrated design; however, an alternate design is also envisioned to control the robot body's orientation; this is represented by roll, pitch, and yaw angles. In this alternate case, two motors instead of one need to be employed for the tail function so that the tail can rotate about two axes. It should be appreciated that the present tail assembly may be optionally used in combination with the jumping, steering and self-righting features of the robot shown in FIG. 1.

Figure 26:
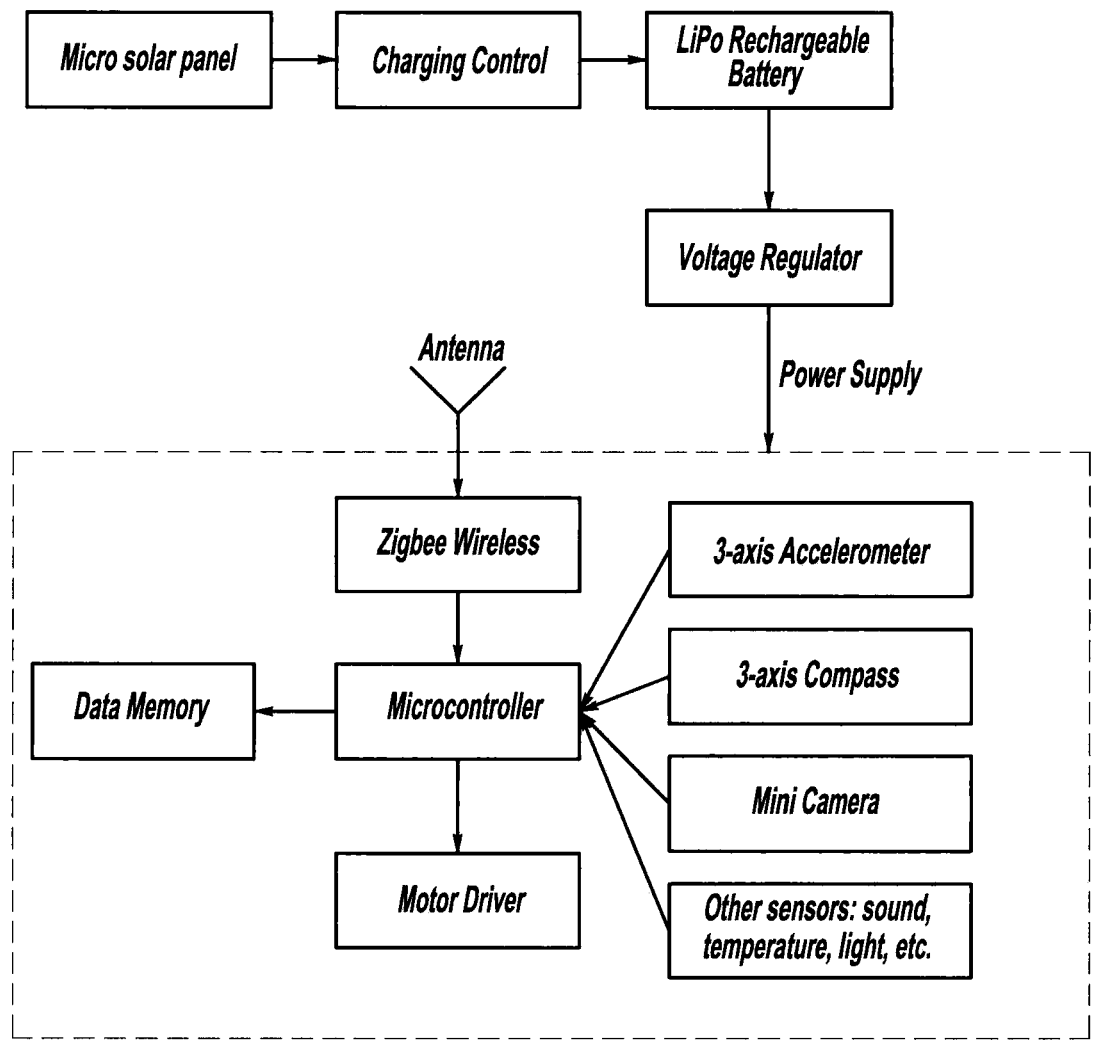
FIG. 26 is a circuit diagram of the jumping robot.

FIGS. 26 and 27 show an array of multiple jumping robots 31 with an electrical circuit 261 for each. The accessory assembly further includes one or more of: a three axis accelerometer, a three axis compass, and a mini-camera. The sensor can be a microphone for sensing sound, a thermal sensor, a light sensor, a vibration sensor, a camera, or other sensors. The sensed information, such as a person trapped in rubble, causes a signal to be sent to the on-board microprocessor or controller which compares such to a pre-stored value in data memory; the microprocessor then determines if an appropriate wireless signal should be transmitted via the antenna to a remote communications and control device, such as an airborne satellite 263, an airplane, a fixed terrestrial command station receiver or a hand-held command controller. The gyroscope or compass signals allow the microprocessor to determine robot direction and the accelerometer signal allows the microprocessor to determine time for an opportunity window for communications and/or sensing. The jumping or spinner mechanisms can optionally impart rotation on the airborne robot as it rises and descends back to Earth; this assists the gyroscope, compass, accelerometer and microprocessor in localizing and positioning one robot relative to the others.

Figure 28:
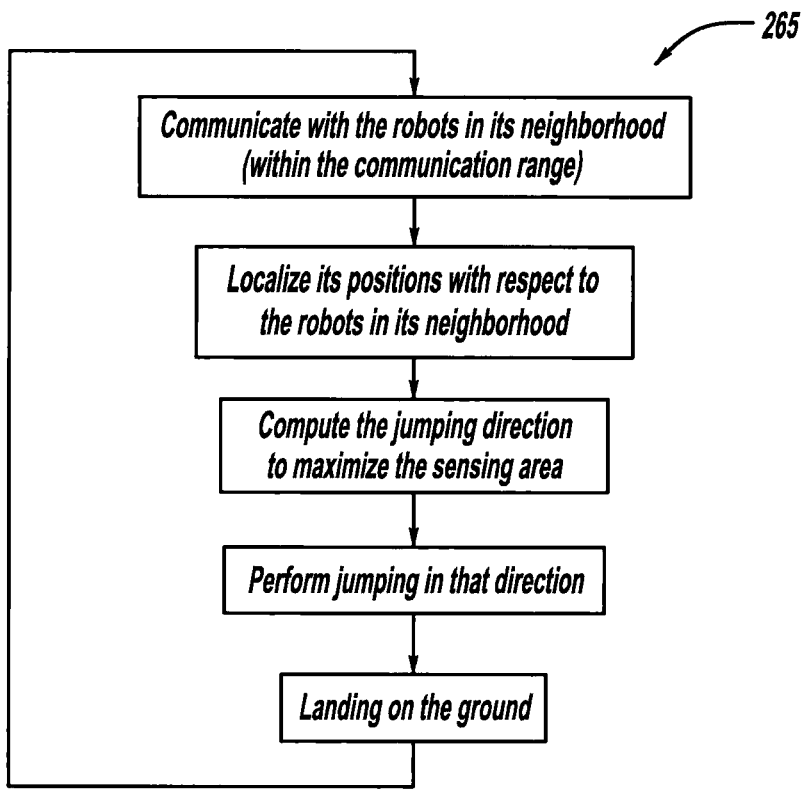
FIG. 28 is a software logic diagram of the jumping robots of FIG. 27.

The remote communications device further sends a movement signal to each robot 31 to cause the on-board microprocessor to energize the actuator motor to cause jumping, steering and/or self-righting movements. The on-board microprocessor controller and/or the remote communications device are connected to non-transient memory, such as ROM, RAM, a disk or a removeable memory chip, within which are programmed software instructions 265. The software instructions, as depicted in FIG. 28, allow the robots to use the accelerometer, compass and communications signals (such as through triangulation between known locations), to move the robots to optimum locations with respect to each other. Furthermore, the jumping height enhances the ability of each robot to send and receive line-of-sight communications signals over obstacles 267. Moreover, a parachute 269 or helical spinner can optimally be deployed above robot 31 when it is airborne, or wings attached to the self-righting arms which are extended after jumping, in order to slow down descent of the robot to assist in sensing or communicating for a longer period of time.

While various features of the present jumping robot have been disclosed, other variations can be employed. For example, while two outwardly bending jumping legs have been disclosed, three, four or more bending legs can alternately be used, although some of the light weight and, thus, jumping height advantages may not be achieved. Furthermore, cable 99 and pullies 101 may be replaced by one or more chains or rigid articulated links, although certain advantages may not be realized. Additionally, alternate gearing combinations, steering wheels (instead of gears 171), biasing members, and leg and arm shapes may be utilized, but certain advantages may not be found. Moreover, it is alternately envisioned that the robot can be peripherally coated with a hydrophobic polymer, and provided with larger ground-contacting surface areas (e.g., at the foot), allowing for jumping from a surface of water upon which it rests. Accordingly, such variations are not to be regarded as a departure from the disclosure, and all such modifications are intended to be included within the scope of the present invention.

The invention claimed is:

1. A robot comprising:
    a body;
    legs for jumping;
    an electromagnetic actuator and the legs being coupled to the body;
    a member moving relative to the body in response to energization of the actuator, the member assisting in at least one of: (a) steering and (b) self-righting, the body and legs; and
    at least one accessory coupled to the body, the accessory being at least one of: (a) a sensor, (b) a camera, (c) a communications transmitter, (d) a compass, (e) a gyroscope, or (f) an accelerometer;
    the entire robot weighing less than 50 grams, jumping at least 20 cm high and having maximum linear height and width dimensions of less than 10 cm.

2. The robot of claim 1, wherein the member is rotated by the actuator to steer the body and legs by a peripheral surface of the member contacting the ground.

3. The robot of claim 2, wherein the member is a gear and the peripheral surface includes teeth around the entire periphery of the gear, and the gear steers when the body and legs are laying on their side.

4. The robot of claim 1, wherein the member is an elongated arm that pivots in response to actuation of the actuator, the arm self-righting the body and legs by the arm pushing up from the ground.

5. The robot of claim 4, further comprising a second elongated arm pivoting about an axis on an opposite side of the body from the other arm, and a joint connecting together the arms on the other side of the axis from a distal end of the second arm.

6. The robot of claim 1, further comprising a crank coupled to an elongated driver, the crank pulling the driver in response to energization of the actuator, bottom ends of the legs being pulled closer to the body when the crank pulls the driver, and the legs pushing the entire robot off of the ground by at least 50 cm when the crank releases the driver.

7. The robot of claim 6, wherein a pair of the legs are articulated toward and away from each other and connected together by a single foot, an end of the driver opposite the crank is affixed to the foot, and the driver is a flexible cable.

8. The robot of claim 6, further comprising a one-way bearing allowing the crank to quickly release the driver, and at least one spring coupled to each leg causing the jumping motion, the legs causing the robot to jump at an angle offset from vertical to provide movement across the ground.

9. The robot of claim 1, further comprising:
    a microprocessor mounted to the body;
    the at least one accessory providing a signal to the microprocessor indicative of when the body has jumped off the ground; and
    the microprocessor causing the at least one accessory which also includes the communications transmitter, to transmit when the robot has jumped off the ground.

10. The robot of claim 1, wherein:
    the single electromagnetic actuator, which is a battery powered electric motor, operably causes steering, self-righting and jumping of the robot;
    the sensor, camera and communications transmitter are mounted to the body; and
    the legs have knees that bend outwardly away from each other.

11. A robot comprising:
    a body;
    legs operably causing the body, to which they are attached, to jump off the ground;
    an electromagnetic actuator coupled to the body; and
    a rotor operably rotated by the actuator and steering the robot when the robot is located on its side and the rotor contacts the ground.

12. The robot of claim 11, further comprising an elongated tail moveable relative to the body through a motor-driven rotor.

13. The robot of claim 11, wherein the rotor is a gear and peripherally mounted teeth thereon contact the ground.

14. The robot of claim 11, further comprising:
    a second rotor outwardly projecting from the body and operably rotated by the same actuator, the second rotor contacting the ground to steer the robot on an opposite side; and
    at least one gear coupling both of the rotors to a drive shaft driven by the electromagnetic actuator which is an electric motor.

15. The robot of claim 11, further comprising an elongated arm extending away from the body to self-right the robot from its side to an upright orientation entirely supported on the legs thereafter, the arm being moved by the same actuator which rotates the rotor.

16. The robot of claim 11, further comprising a crank coupled to an elongated member, the crank pulling the member in response to energization of the actuator, distal ends of the legs being pulled closer to the body when the crank pulls the member, and the legs pushing the entire robot off of the ground by at least 50 cm, and the crank being rotated by the same actuator which rotates the rotor.

17. The robot of claim 11, wherein:
    a pair of the legs are articulated toward and away from each other and connected together by a single foot;
    the same actuator which rotates the rotor also causes the foot to retract toward the body; and
    further comprising springs coupled to the legs causing the legs to jump.

18. The robot of claim 11, further comprising:
    a sensor mounted on the body;
    the entire robot weighing less than 50 grams; and
    the entire robot jumping at least 20 cm off the ground.

19. A robot comprising:
    a body;
    a single electric motor coupled to the body;
    articulated jumping legs coupled to the body, energization of the single electric motor moving the legs relative to the body;

a self-righting surface coupled to the body, energization of the single electric motor moving the self-righting surface relative to the body; and a steering surface coupled to the body, energization of the single electric motor moving the steering surface relative to the body.

20. The robot of claim 19, further comprising:
an accelerometer coupled to the body;
a communications transmitter coupled to the body;
the entire robot weighing less than 50 grams;
the entire robot jumping at least 20 cm off the ground; and
the transmitter sending communication signals when the robot is airborne due to the jumping.

21. The robot of claim 19, wherein the self-righting surface is part of an elongated arm pivotally connected to the body, and the self-righting surface pushes the body away from the ground when the robot is on its side.

22. The robot of claim 19, wherein the steering surface is part of a rotor, and the steering surface contacts the ground when the robot is on its side.

23. The robot of claim 19, wherein the steering surface includes a set of teeth contacting against the ground.

24. The robot of claim 19, further comprising:
a second steering surface outwardly projecting from the body and operably moved by the motor, the second steering surface contacting the ground to steer the robot; and
at least one gear coupling both of the steering surfaces to an output shaft driven by the same motor.

25. The robot of claim 19, further comprising a crank coupled to an elongated member, the crank pulling the member in response to energization of the motor, the legs being pulled closer to the body into a cocked orientation when the crank pulls the member.

26. The robot of claim 19, wherein:
a pair of the legs are articulated toward and away from each other and connected together by a single foot;
the same motor which rotates the steering surface also causes the foot to retract toward the body; and
further comprising springs coupled to the legs causing the legs to jump.

27. A robot comprising:
a body;
jumping legs coupled to the body;
at least one spring biasing the legs away from the body;
an elongated first member coupled to the legs; and
an actuated second member operably pulling the first member which causes portions of the legs to retract toward the body;
the spring causing the legs to push the entire robot at least 20 cm off the ground.

28. The robot of claim 27, further comprising a one-way bearing allowing the second member to quickly release the first member, and the at least one spring including at least one torsion spring located at an articulated joint between each of the legs and the body.

29. The robot of claim 27, wherein the first member is a flexible cable attached to a foot spanning between ends of the legs.

30. The robot of claim 27, further comprising an electric motor, wherein the second member is a crank rotated by the electric motor.

31. The robot of claim 27, further comprising:
at least one of: (a) a sensor and (b) a camera, mounted on the body;
a moveable arm operably self-righting the body; and a rotatable steering surface laterally extending past a side of the body and contacting against the ground in at least one orientation of the robot.

32. A robot comprising:
a body;
jumping legs coupled to the body by an articulated hip joint;
each of the legs including an upper femur and a lower tibia coupled together at an articulated knee joint;
at least one foot coupled to ends of the legs at articulated ankle joints;
at least one spring coupled to the legs to cause the legs to push the robot at least 20 cm off the ground;
the knee joints articulating away from each other when the legs are retracted toward the body prior to jumping; and
one of: (a) a sensor; (b) a camera, (c) a communications transmitter, (d) a gyroscope, (e) a photovoltaic generator, (f) a position indicator, and (g) a motor-driven tail automatically moveable to reorient the body in mid-air based on a real-time and closed loop control system, mounted to the body.

33. The robot of claim 32, wherein a rotor moveably connects the tail to the body and the tail includes an elongated rod within an enlarged weight adjacent a distal end thereof.

34. The robot of claim 32, further comprising an electromagnetic actuator mounted to the body and assisting in retraction of the legs toward the body.

35. The robot of claim 34, further comprising an elongated arm extending away from the body to self-right the robot from its side to an upright orientation entirely supported on the legs, the arm being moved by the same actuator which retracts the legs.

36. The robot of claim 32, wherein:
at least one of: (a) the sensor; and (b) the camera, is mounted on the body;
the entire robot weighs less than 50 grams;
the greatest linear dimension of the entire robot is less than 10 cm; and
the robot jumps off of the ground at least 100 times on a single battery charge.

37. A robot system comprising:
(a) at least two robots, each of which comprises:
    (i) a body;
    (ii) legs moveable coupled to the body;
    (iii) an electromagnetic actuator causing the legs to move relative to the body;
    (iv) a controller determining a three-dimensional position of the associated robot;
    (v) at least one of: (a) a sensor and (b) a camera, coupled to the body;
    (vi) the legs pushing the associated robot at least 20 cm off of the ground and the associated robot weighing less than 50 grams; and
(b) a remote communications device receiving signals from the robots and sending signals back to the robots to cause the robots to move their positions along the ground.

38. The robot system of claim 37, wherein the robots spin when airborne to enhance at least one of: communications or sensing.

39. The robot system of claim 37, further comprising at least one of: a three-dimensional compass or gyroscope, sending a signal to the controller.

40. The robot system of claim 37, further comprising a global positioning system using triangulation, the global positioning system sending a signal to the controller.

41. The robot system of claim 37, wherein the sensor is an accelerometer detecting when the associated robot is airborne.

42. The robot system of claim 37, wherein the remote communications member is a satellite, an airplane, a fixed terrestrial command station receiver or a hand-held command controller.

43. The robot system of claim 37, wherein the sensor detects human presence near the associated robot adjacent a dangerous environment on Earth.

44. A robot comprising:
a body;
jumping legs being coupled to the body and causing the robot to jump off of the Earth by at least 20 cm;
at least one accessory coupled to the body, the accessory being at least one of: (a) a sensor, (b) a camera, (c) a communications transmitter, (d) a compass, (e) a gyroscope, or (f) an accelerometer, being coupled to the body;
an enlarged drag surface slowing descent of the robot when airborne, and the robot intentionally spinning as it descends back to Earth.

45. The robot of claim 44, further comprising:
at least one of: (a) the sensor or (b) the camera, mounted on the body;
a moveable arm operably self-righting the body; and
a rotatable steering surface laterally extending past a side of the body and contacting against the ground in at least one orientation of the robot.

46. The robot of claim 44, wherein the enlarged drag surface includes a parachute tethered above the body.

47. The robot of claim 44, wherein the enlarged drag surface includes a spinner tethered above the body.

48. The robot of claim 44, wherein the enlarged drag surface includes wings coupled to extendable self-righting arms which are pivotably attached to the body.

* * * * *